US010807678B2

(12) United States Patent
Levin

(10) Patent No.: US 10,807,678 B2
(45) Date of Patent: Oct. 20, 2020

(54) PORTABLE SOLAR-ELECTRIC WATERCRAFT

(71) Applicant: Designer Direct, Inc., Des Plaines, IL (US)

(72) Inventor: Kerry Ira Levin, Des Plaines, IL (US)

(73) Assignee: Designer Direct, Inc., Des Plaines, IL (US)

(*) Notice: Subject to any disclaimer, the term of this patent is extended or adjusted under 35 U.S.C. 154(b) by 34 days.

(21) Appl. No.: 16/191,779

(22) Filed: Nov. 15, 2018

(65) Prior Publication Data

US 2019/0144076 A1 May 16, 2019

Related U.S. Application Data

(60) Provisional application No. 62/586,865, filed on Nov. 15, 2017.

(51) Int. Cl.
*B63B 7/08* (2020.01)
*B63B 3/32* (2006.01)
(Continued)

(52) U.S. Cl.
CPC .............. *B63B 7/082* (2013.01); *B63B 1/121* (2013.01); *B63B 3/32* (2013.01); *B63B 17/02* (2013.01);
(Continued)

(58) Field of Classification Search
CPC ......... B63B 7/082; B63B 1/121; B63B 35/34; B63B 17/02
See application file for complete search history.

(56) References Cited

U.S. PATENT DOCUMENTS

| 4,683,901 A | 8/1987 | Mitchell |
| 4,766,830 A * | 8/1988 | Kunz ..................... B63B 1/121 |
| | | 114/127 |

(Continued)

FOREIGN PATENT DOCUMENTS

| AU | 3817678 A | 7/1978 |
| CA | 2916336 | 10/2016 |

(Continued)

OTHER PUBLICATIONS

Grace Period Disclosure: "Aquaport", https://web.archive.org/web/20180703032618/http://www.pier-port.com/aqua-port/ (Archive.org Snapshot Date: Jul. 3, 2018).

(Continued)

*Primary Examiner* — S. Joseph Morano
*Assistant Examiner* — Jovon E Hayes
(74) *Attorney, Agent, or Firm* — Steven L. Fisher-Stawinski

(57) ABSTRACT

A watercraft includes a pair of inflatable pontoons. Releasably affixed atop each of the pontoons and aligned therewith are inner and outer lengthwise frame members. Forward and aft beamwise frame members are affixed to the inner and outer lengthwise frame members. Primary arch members are affixed to the forward and aft beamwise frame members. A main fabric panel is stretched between the pair of primary arch frame members, the forward beamwise frame member, and the aft beamwise frame member. A motor mount is affixed centrally to the aft beamwise frame member, the motor mount being configured to removably support a motor assembly. Aft panel side members are rotatably-lockably affixed to the aft beamwise frame member and joined by an aft panel top member. An aft fabric panel is stretched between the aft panel side members, the aft beamwise frame member, and the aft panel top member.

18 Claims, 26 Drawing Sheets

(51) Int. Cl.
- B63B 35/34 (2006.01)
- B63B 17/02 (2006.01)
- B63B 1/12 (2006.01)
- B63B 7/00 (2020.01)
- B63H 21/17 (2006.01)
- B63B 34/00 (2020.01)

(52) U.S. Cl.
CPC .............. *B63B 35/34* (2013.01); *B63B 34/05* (2020.02); *B63B 2007/003* (2013.01); *B63B 2209/18* (2013.01); *B63B 2221/22* (2013.01); *B63B 2241/26* (2013.01); *B63B 2701/12* (2013.01); *B63B 2755/00* (2013.01); *B63H 2021/171* (2013.01)

(56) References Cited

U.S. PATENT DOCUMENTS

| | | | |
|---|---|---|---|
| 4,825,890 A | 5/1989 | Castlebury | |
| 5,573,026 A | 11/1996 | Griffith | |
| 6,302,042 B1 | 10/2001 | Harris | |
| 6,345,582 B1 | 2/2002 | Dudunk | |
| 7,383,787 B2 * | 6/2008 | Flood | B63B 7/06 114/353 |
| 7,461,607 B2 | 12/2008 | Reilly | |
| 9,278,730 B2 | 3/2016 | Kaye | |
| 9,556,640 B2 | 1/2017 | Levin | |
| 9,776,687 B2 | 10/2017 | Levin | |
| 9,777,504 B2 | 10/2017 | Levin | |
| 10,145,073 B2 | 12/2018 | Levin | |
| 2004/0211350 A1 * | 10/2004 | Carter | B60F 3/0092 114/344 |
| 2012/0073491 A1 | 3/2012 | Signorini | |
| 2014/0102351 A1 * | 4/2014 | Kaye | B63B 29/04 114/354 |
| 2017/0254038 A1 | 9/2017 | Levin | |
| 2017/0349242 A1 | 12/2017 | Levin | |
| 2017/0350156 A1 | 12/2017 | Levin | |
| 2018/0111663 A1 | 4/2018 | Levin | |
| 2019/0063024 A1 | 3/2019 | Levin | |
| 2019/0144076 A1 * | 5/2019 | Levin | B63B 1/121 114/345 |

FOREIGN PATENT DOCUMENTS

| | | |
|---|---|---|
| CA | 2933478 | 12/2016 |
| CA | 2959902 | 9/2017 |
| CA | 3010646 | 1/2019 |
| DE | 20200806268 U1 | 10/2008 |
| DE | 102007015279 A1 | 10/2008 |
| DE | 202008015159 U1 | 4/2009 |
| FR | 2921631 A1 | 4/2009 |
| GB | 2387145 B | 8/2003 |
| GB | 2451237 B | 1/2009 |
| KR | 20090117524 A | 11/2009 |

OTHER PUBLICATIONS

"Go-Float Electric Boats—Easy Quiet Fun!", Go-Float.com, https://web.archive.org/web/20160916092019/http://go-float.com:80/ (archive.org snapshot dated Sep. 16, 2016).

"FunCat—Electric Catamaran", Homepage, funcats.com, http://web.archive.org/web/20150429021427/http://www.funcats.com:80/ (archive.org snapshot dated Apr. 29, 2015).

"FunCat—Electric Catamaran", Specifications, funcats.com, http://web.archive.org/web/20171021213438/http://www.funcats.com:80/html/specifications.html (archive.org snapshot dated Oct. 21, 2017).

"Sub Sea Systems—Our World: FunCat electric catamarans now powered by solar!", Sub Sea Systems, http://web.archive.org/web/20160424013010/http://subseasystems.blogspot.com/2016/01/funcat-electric-catamarans-now-powered.html (dated Jan. 9, 2016, archive.org snapshot dated Apr. 24, 2016).

"FunCats > More Info", funcats.com, http://web.archive.org/web/20030211132540/http://www.funcats.com:80/fc_info.html (archive.org snapshot dated Feb. 11, 2003).

"240 Dauntless Boat Model", Boston Whaler, https://web.archive.org/web/20170501094557/https://www.bostonwhaler.com/family-overview/dauntless-boat-models/240-dauntless/ (archive.org snapshot dated May 1, 2017).

"Chilli Island Fuses Electric Boat and Lounger into One", Kshiv, Pallvika, Homecrux, http://www.homecrux.com/chilli-island-fuses-electric-boat-and-lounger-into-one/33912/ (Dated Sep. 1, 2015).

"Small Outboard Motor Boats", "Outboard Mini-Toons", Kennedy Pontoons, https://web.archive.org/web/20171016021844/http://www.kennedypontoons.com/outboard-mini-toon.html (archive.org snapshot dated Oct. 16, 2017).

"Solar-Electric and Hybrid Boats", Off the Grid News, https://www.offthegridnews.com/grid-threats/solar-electric-and-hybrid-boats/print/ (dated Jul. 6, 2011).

"Ecosun 100-Watt Flexible Monocrystalline 18V Photovoltaic Solar Panel", Windsoleil, https://web.archive.org/web/20170913110806/https://www.windsoleil.com/new-products-1/ecosun-100-watt-flexible-monocrystalline-18v-photovoltaic-solar-panel (archive.org snapshot dated Sep. 13, 2017).

My Solar Power Dream:, Sea Eagle Inflatable Adventures, https://blog.seaeagle.com/2011/02/04/my-solar-power-dream/ (dated Feb. 4, 2011).

"Using Solar Power to Run Electric Boats", Thomas, Justin, Metaefficient, https://metaefficient.com/boats/solar-power-run-electric-boats.html (dated Aug. 19, 2011).

"Brand New 4 Person Solar Powered 12.8' Electric Fishing Boat Free Ship by Sea", Ebay, https://www.ebay.com/itm/Brand-New-4-Person-Solar-Powered-12-8-Electric-Fishing-Boat-Free-Ship-by-Sea-/131853371542?nordt=true&orig_cvip=true&rt=nc&_trksid=p2047675.m43663.l10137 (Accessible as of Nov. 11, 2017 based on dated communication from Inventor to Attorney with original link to https://www.ebay.com/itm/Brand-New-4-Person-Solar-Powered-12-8-Electric-Fishing-Boat-Free-Ship-by-Sea-/132697268432?oid=131853371542).

* cited by examiner

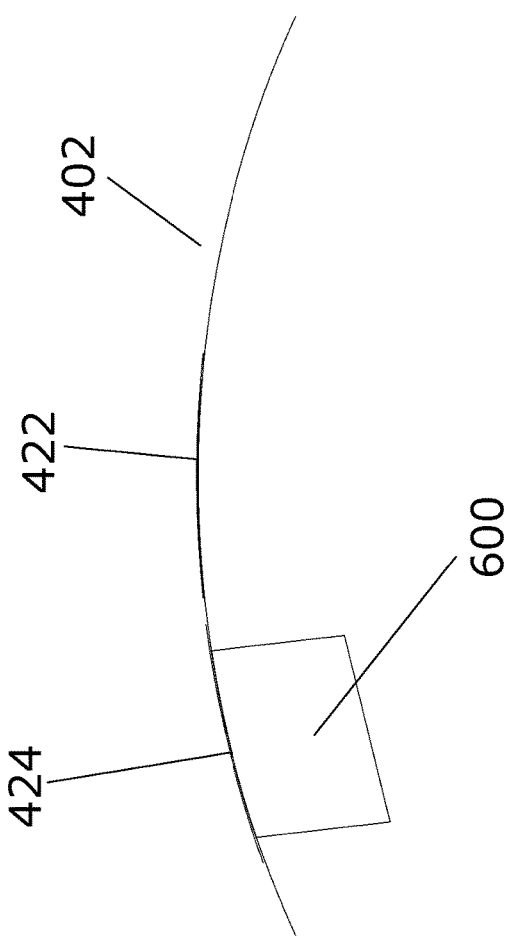
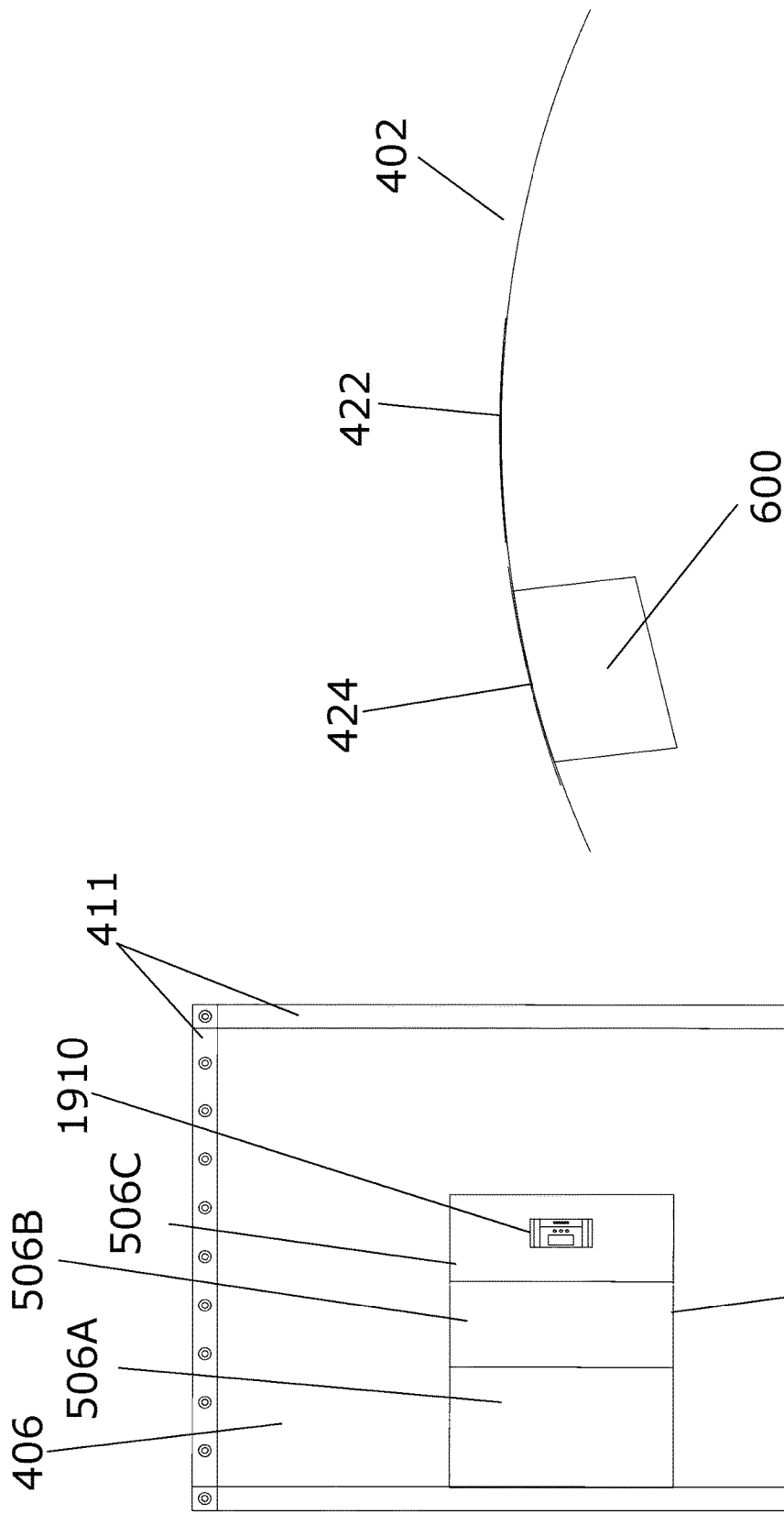
FIG. 6
FIG. 5

PORTABLE SOLAR-ELECTRIC WATERCRAFT

BACKGROUND OF THE INVENTION

The invention relates generally to watercraft and, in particular, to solar-electric powered watercraft.

Recent improvements in photovoltaic and battery technology have made newly viable applications of solar-electric energy where previously only fuel-based energy was viable. In the area of watercraft, electrically powered trolling motors have been considered underpowered and suitable only for low-noise and/or low wake applications, often in conjunction with a gasoline engine. At the same time, light and portable watercraft have previously relied on paddles or other human power due to the weight and cost associated with either a fuel-powered outboard or inboard motor and fuel tank or an electric motor with sufficient energy storage to be useful. More recently, small battery or solar-electric boats have emerged to take advantage of recent advances in electrical energy, however these retain the disadvantages associated with boats generally, namely double-hull construction with bilge pumps, trailer-based transport, and inconvenient storage out of the water, together with increased energy requirements associated with moving a full boat hull around a body of water, even if only low-speed cruising is desired. Watercraft users continue to face challenges in finding a convenient, inexpensive, and portable, solution for low-speed and low-noise powered cruising and general requirements less than a standard motorboat, speedboat, or personal watercraft.

SUMMARY OF THE INVENTION

A watercraft includes a pair of inflatable pontoons. Releasably affixed atop each of the inflatable pontoons and aligned therewith is an inner lengthwise frame member and an outer lengthwise frame member such that loads applied to the inner lengthwise frame member and outer lengthwise frame member oppose buoyant forces applied to each of the pair of inflatable pontoons to urge each of the pair of inflatable pontoons between the inner lengthwise frame member and the outer lengthwise frame member. A forward beamwise frame member is affixed to both the inner lengthwise frame member and the outer lengthwise frame member of both of the pair of inflatable pontoons. An aft beamwise frame member is affixed to both the inner lengthwise frame member and the outer lengthwise frame member of both of the pair of inflatable pontoons. A pair of primary arch members are affixed at their ends to the forward beamwise frame member and the aft beamwise frame member, each of the pair of primary arch members being configured to arch upward relative to the inner lengthwise frame member and the outer lengthwise frame member. A main fabric panel is stretched between the pair of primary arch frame members, the forward beamwise frame member, and the aft beamwise frame member. A motor mount is affixed centrally to the aft beamwise frame member, the motor mount being configured to removably support a motor vertical member, the motor vertical member being configured to pivot within the motor mount, the motor vertical member extending vertically down below the pontoons and supporting an electric trolling motor thereat, and the motor vertical member supporting a tiller above the motor mount. A pair of aft panel side members are each rotatably-lockably affixed to the aft beamwise frame member. An aft panel top member is affixed at its ends to each of the pair of aft panel side members. An aft fabric panel is stretched between the pair of aft panel side members, the aft beamwise frame member, and the aft panel time member, the aft fabric panel including a gap located against the aft beamwise frame member, the gap being shaped to accommodate the tiller.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 5 is a bottom plan view of a Bimini top panel for a watercraft, according to least one embodiment of the invention.

FIG. 6 is a starboard profile view of a seat panel with storage container installed for a watercraft, according to at least one embodiment of the invention.

DETAILED DESCRIPTION OF THE INVENTION

Referring now to the invention in more detail, the invention is directed to a lightweight, portable, inexpensive solar-electric watercraft. Existing boats and powered personal watercraft typically perform optimally at high power when up on a hydroplane. This results from and/or requires the energy storage and power output of fuel-based propeller, impeller, or jet engines. Often, watercraft users do not require fast hydroplane capability, and simply want to cruise around a pond or lake at low speeds for relaxation or fishing. For these applications, a boat is overkill, and the hassle and expense involved in obtaining and transporting a powered boat means that many such applications simply go unserved.

Recently, low power solar electric boats have become available to meet this need, however these solutions remain difficult and costly to obtain and transport to the location of use. Additionally, these solutions are no simpler than full powered boats to steer and safely dock. To address these and other shortcomings of the art, some, but not necessarily all, embodiments of the present invention may offer some of the following advantages: Aspects of the present invention provide a lightweight solar-electric watercraft based on inflatable pontoons that can be transported without a trailer by a car or light SUV equipped with a roof rack. Aspects of the present invention provide a multiple configurable watercraft frame that is extensible to multiple applications, such as fishing, sunbathing, and family boating. Aspects of the present invention provide a watercraft that can be easily steered and moored by a child or novice; in particular, the light weight of the watercraft combined with inflatable pontoons prevent dock or watercraft from being damaged in collisions.

Figure 1:
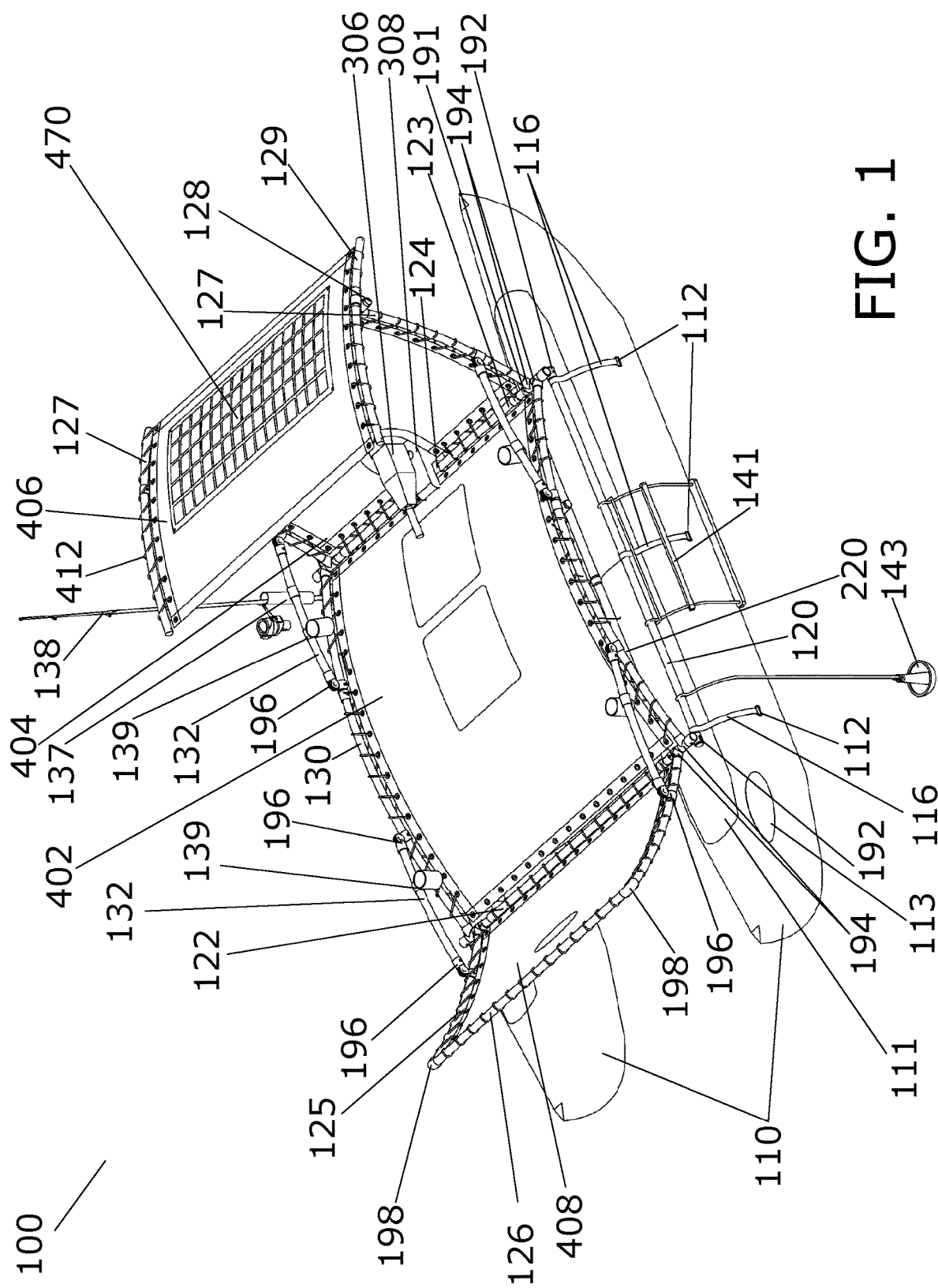
FIG. 1 is an elevated port-forward perspective view of a watercraft, according to at least one embodiment of the invention.

Referring now to FIG. 1, FIG. 1 is an elevated forward port-side perspective view of an exemplary watercraft 100, according to at least one embodiment of the invention. Supporting the watercraft 100 in the water (the water surface is not shown) are a pair of inflatable pontoons 110. In various embodiments, the pontoons 110 may be made of a flexible and airtight material, including tightly woven and monolithic plastic or rubber materials. A chafing pad 111 is positioned on the top surface of the pontoon 110. The chafing pad 111 may be an additional layer of the same material as the pontoon 110, positioned on top and adhered by bonding, heat treatment, adhesives, or stitching to the material of the pontoon 110. The chaffing pad 111 may function to resist or absorb wear and damage from friction between the pontoon 110 and other elements of the watercraft 100. Additional chafing pads 110 may be positioned on the bottom surface of the pontoon 110 with at least one intended function to resist or absorb wear and damage from contact between the pontoon 110 and the shore or water body bed.

Referring still to FIG. 1, the pontoon 110 may have affixed thereto a pontoon indicia patch 113 bearing any indicia or logo desired, for example, a mark of an entity producing the watercraft 100. The pontoon indicia patch 113 may be affixed by adhesive, bonding agent, heat treatment, stitching, or other means.

Additionally, a plurality of D-rings 112 is provided. In the depicted embodiment, the D-rings 112 are arranged in two rows of three on the upper sides of each pontoon 110, as shown. Alternative configurations, such as additional rows or additional D-rings 112 per row, are contemplated. The D-rings 112 may be affixed to the pontoons 110 by a patch. Specifically, each D-ring may pierce and/or penetrate a patch of material, for example the same or similar material to that of the pontoons 110, which may be adhered, fused, bonded, melted, melded, cemented, stitched or otherwise affixed to the pontoon 110, in a manner that does not compromise the airtightness of the pontoon 110. The D-rings 112 may be made of steel, aluminum, or other metal material; various high impact plastics and resins and other rigid or semirigid durable materials are contemplated.

Referring still to FIG. 1, in the depicted embodiment, each pontoon 110 supports an inner lengthwise frame member 220 and an outer lengthwise frame member 120. As used herein, "lengthwise" refers to the bow-stern dimension of a watercraft. The inner and outer lengthwise frame members 220 and 120 may be understood as aligned both lengthwise and to the pair of inflatable pontoons 110, which are also aligned lengthwise. The inner lengthwise frame member 220 and outer lengthwise frame member 120, as shown, maybe positioned to run along the surface of the pontoons 110. A plurality of straps 116 may also be provided. The straps 116 may be made of a polyester, nylon, or polypropylene webbing or other woven fiber material; leather, silicone, natural rubber, or other monolithic flexible materials are also contemplated. Each strap 116 may be configured in a loop through one of the D-rings 112 and either the inner lengthwise frame member 120 or the outer lengthwise frame member 220. The inner lengthwise frame member 220 and the outer lengthwise frame member 120 may be maintained parallel relative to one another by internal forces transferred via the other frame members described in greater detail below. Thus, each of the inner lengthwise frame member 220 and the outer lengthwise frame member 120 may be secured to the pontoon 110 via the straps 116. Since both rows of straps 116 on each pontoon 110 are under tension, the pontoon remains secured to the inner lengthwise frame member 220 and outer lengthwise frame member 220. Further, each set of an inner lengthwise frame member 220, an outer lengthwise frame member 120, and pontoon 110 may be understood as opposing in forces, specifically a buoyant force of the water urging the pontoon 110 upward against a load applied to the inner lengthwise frame member 220 and outer lengthwise frame member such that the pontoon 110 is urged between the inner lengthwise frame member 220 and the outer lengthwise frame member 120.

Each strap may be looped adjustably, for example using a ratchet strap or tie-down strap mechanism, a cinch, a knot, or other means for tightening and/or loosening the straps 116, such as including all or a portion of the straps 116 as elastic material that can self-tension under a load. In embodiments including a ratchet strap, tie-down strap, or cinch, users may tighten or loosen the straps 116 in-situ while boarded to account for changes in the inflation of the pontoons 110 as a result of temperature changes due to time of day or weather.

Figure 2:
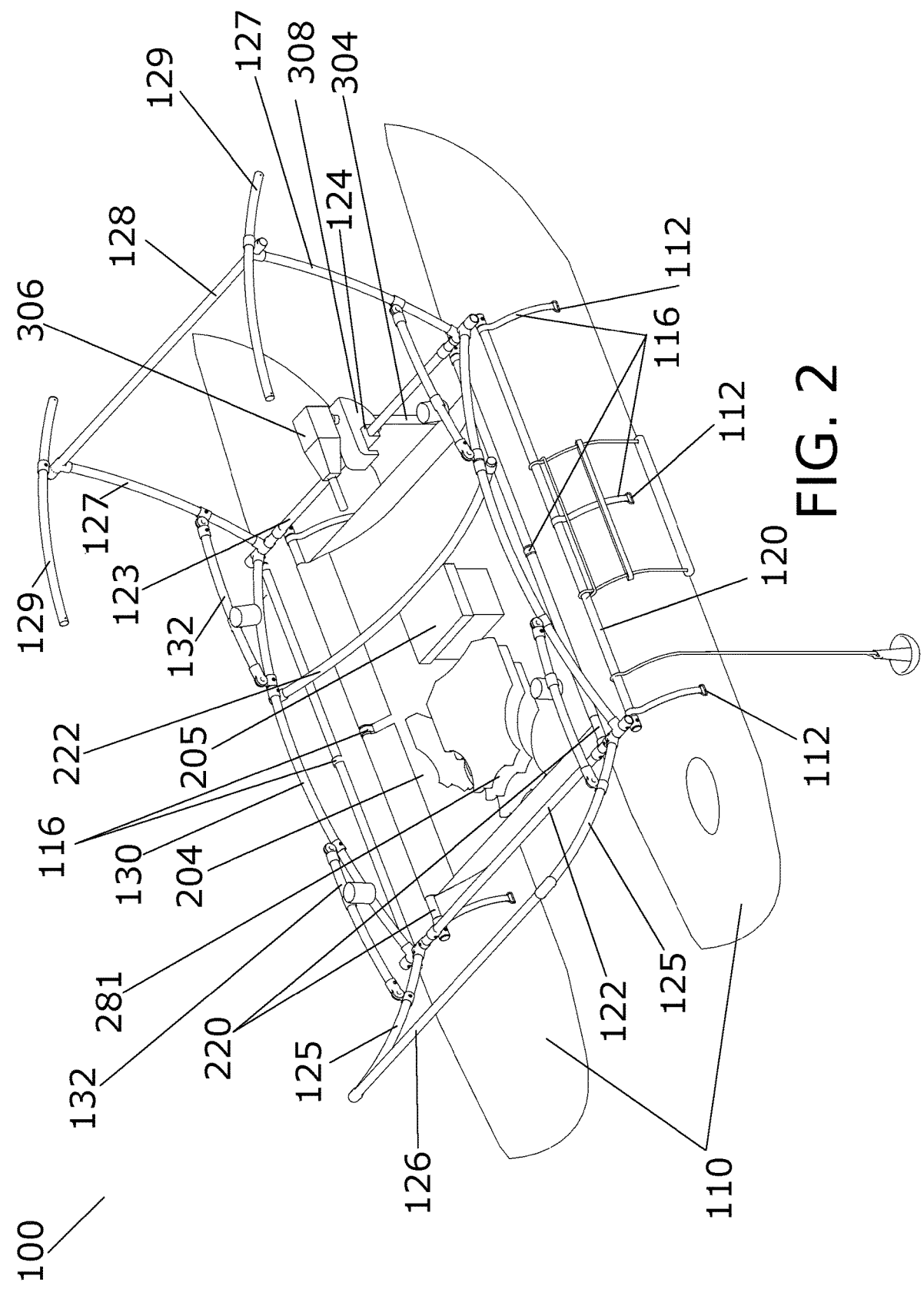
FIG. 2 is an elevated port-forward perspective view of a watercraft with fabric panels removed, according to at least one embodiment of the invention.
Figure 3:
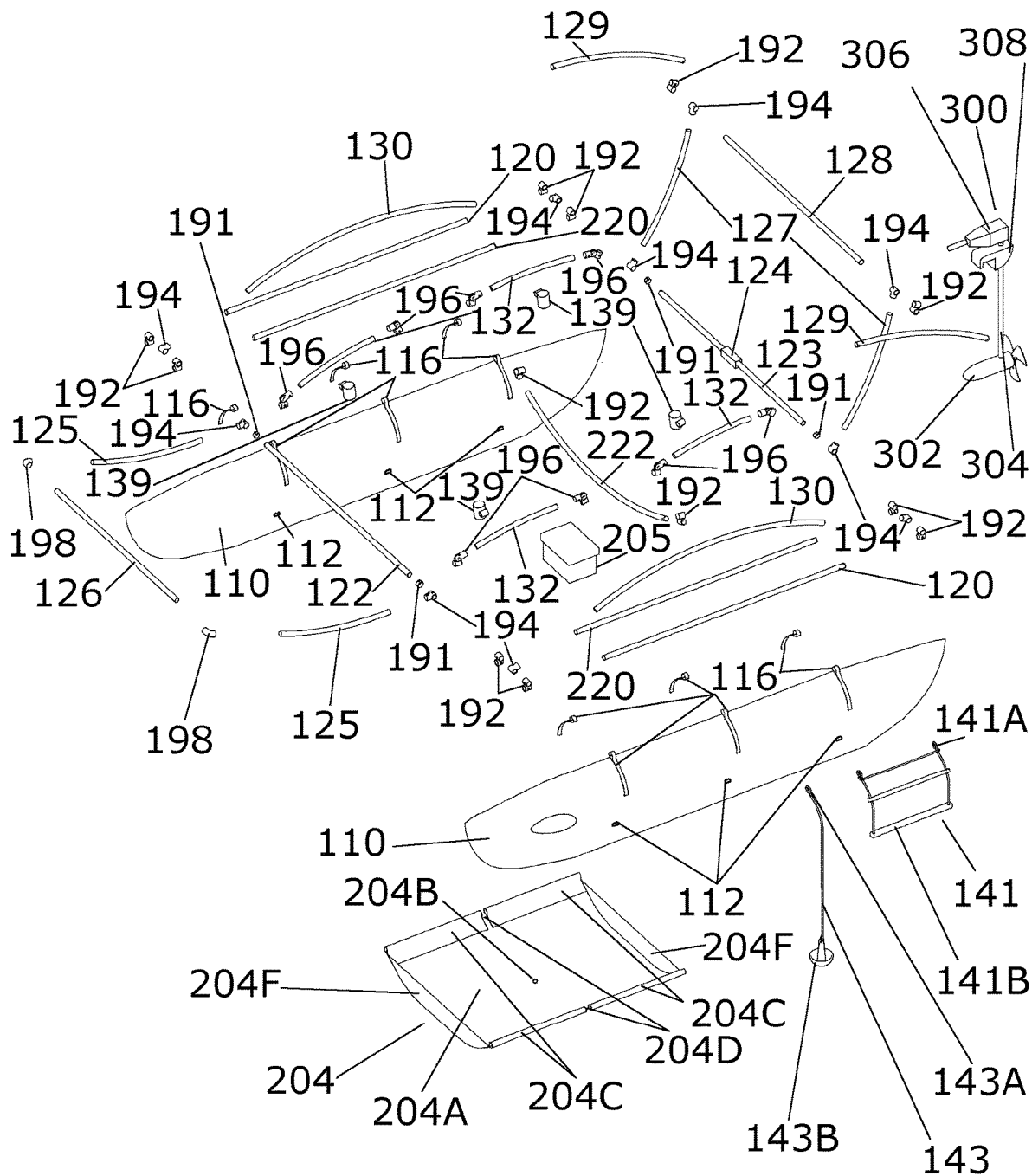
FIG. 3 is an exploded elevated port-forward perspective view of a watercraft with fabric panels removed, according to at least one embodiment of the invention.

In addition to FIG. 1, FIG. 2 depicts a view of the watercraft 100 with various panel elements removed, exposing various frame members. FIG. 3 shows various frame members in exploded view. Referring now to the embodiments depicted in FIGS. 1-3, the inner lengthwise frame members 220 and outer lengthwise frame members 120 are both affixed to a forward beamwise frame member 122 and aft beamwise frame member 123. As used herein "beamwise" refers to the port-starboard dimension of a watercraft. In the depicted embodiment, these joints are completed by right-angle tubular connectors 192. Each annular opening of the right-angle tubular connectors 192 may be secured by an embedded bolt, such as an Allen bolt or a hand-tightenable bolt fitted with a knob or wing nut, which, when loosened, allows the forward beamwise frame member 122 or aft beamwise frame member 123 to rotate relative to both the inner lengthwise frame members 220 and outer lengthwise frame members 120, and also allow the inner lengthwise frame members 220 or the inner lengthwise frame members 220 to rotate, individually, but not together, relative to the forward frame member 122 and aft beamwise frame member 123.

Referring still to the embodiment depicted in FIGS. 1-3, the outer lengthwise frame members 120 are positioned at the outermost ends of the forward beamwise frame member 122 and aft beamwise frame member 123, and the inner lengthwise frame members 220 are positioned a distance inward from the outer lengthwise frame members 120. Along the intervening lengths at either end of the forward beamwise frame member 122, from outside to in, are: (i) a primary arch frame member 130, secured via a tubular T-connector 194 (the primary arch frame member 130 inserted into the terminal opening of the tubular T-connector 194 and the forward beamwise frame member 122 inserted through the annular opening of the tubular T-connector 194); (ii) a forward panel side member 125, secured via a tubular T-connector 194 (the forward panel side member 125 inserted into the terminal opening of the tubular T-connector 194 and the forward beamwise frame member 122 inserted through the annular opening of the tubular T-connector 194); and (iii) a spacer ring 191. Along the intervening lengths at either end of the aft beamwise frame member 123, from outside to in, are: (i) the primary arch frame member 130, secured via a tubular T-connector 194 (the primary arch frame member 130 inserted into the terminal opening of the tubular T-connector 194 and the aft beamwise frame member 123 inserted through the annular opening of the tubular T-connector 194); (ii) an aft panel side member 127, secured (rotatably-lockably) via a tubular T-connector 194 (the aft panel side member 127 inserted into the terminal opening of the tubular T-connector 194 and the aft beamwise frame member 123 inserted through the annular opening of the tubular T-connector 194); and (iii) a spacer ring 191. The spacer ring 191 and the tubular T-connectors 194, like the right-angle tubular connectors 192, include embedded bolts, such as Allen bolts, to releasable secure any tubular member inserted therein or therethrough. As shown, the primary arch frame member 130 may be configured so that the straight-line distance from each of its ends to the other is equal in length to the inner lengthwise frame members 220 and outer lengthwise frame members 120. Further, the primary arch frame member 130 may be understood as arched upward relative to (meaning that the central region of the arch is vertically higher than) the inner and outer lengthwise frame members 220 and 120.

Referring still to the embodiment of FIGS. 1-3, the forward panel side members 125 may be joined on their upper or forward ends by a forward panel top member 126, secured by tubular corner connectors 198, which may be equipped with embedded bolts, such as Allen bolts, configured to releasably secure the forward panel top member 126 and/or forward panel side member 125. As shown, various embodiments may include the forward panel side members 125 arched concavely aft/upward. By loosening the forward panel side members' 125 connection to the forward beamwise frame member 122, users may adjust the angle of the forward panel.

Referring still to the embodiment of FIGS. 1-3, the aft panel side members 127 may be joined on their upper or aft ends by an aft panel top member 128, secured by tubular T-connectors connectors 194 (the upper/aft ends of the aft panel side members inserted into the terminal openings of the tubular T-connectors 194 and the aft panel top member 128 being inserted through the annular openings of the tubular T-connectors 194). As shown, various embodiments may include the aft panel side members 127 arched concavely forward/upward. By loosening the forward panel side members' 125 connection to the forward beamwise frame member 122, users may adjust the angle of the forward panel (and the the connection may be understood as rotable-lockable). As shown, in the depicted embodiment, the outer ends of the aft panel top member 128 may extend outward from the aft panel side members 127 on each side sufficiently to accommodate a Bimini top frame member 129, rotatably-lockably affixed thereto. The Bimini top frame members 129 may be arched upward/forward, as shown (upward meaning with the central region of the arch vertically higher than the end points).

Referring still to the embodiment depicted in FIGS. 1-3, four secondary arch frame members 132 may be provided. Each of the secondary arch frame members 132 may be affixed to one of the primary arch frame members 130 and either one of the forward panel side members 125 or one of the aft panel side members 127, as shown. These joints may be achieved using tubular angled T-connectors 196. Each tubular angled T-connector links a terminal opening to an annular opening 90° opposed, via an adjustable angle bearing. The adjustable angle bearing may be tightened to a desired tension, and the annular and terminal openings may include embedded bolts, such as Allen bolts, to releasably secure any tubular member inserted therein or therethrough. Thus, the secondary arch frame members 132 may be positioned slidably along the primary arch frame members 130, forward panel side members 125, and/or the aft panel side members 127, with the angle bearing accommodating the resulting change in configuration. This allows the secondary arch frame members 132 to remain affixed in different use or stowage configurations, as discussed further below. The connection may therefore be understood as both slidable-lockable and pivotable-lockable.

Referring still to the embodiment depicted in FIGS. 1-3, a lower beamwise arch frame member 222 may be configured with a downward arch relative to (that is, the central region of the arch is vertically lower than) the primary arch frame members 130 such that the straight-line distance between its ends is equal to the length of the forward beamwise frame member 122 and/or aft beamwise frame member 123. The lower beamwise arch frame member may be affixed to the two primary arch frame members 130, aft of lengthwise center, as shown. These joints may be achieved via tubular right-angle connectors 192.

In various embodiments, the frame elements: inner lengthwise frame members 220, outer lengthwise frame members 120, forward beamwise frame member 122, aft beamwise frame member 123, forward panel side members 125, forward panel top member 126, aft panel side members 127, aft panel top member 128, Bimini top frame members 129, primary arch frame members 130, secondary arch frame members 132, and lower beamwise arch frame member 222, may be made of cylindrical tube steel. In alternative configurations, the various frame members may be made of square, rectangular, or other profile tube or solid steel, as well as aluminum or other metals and alloys. In other embodiments, the various frame members may be made of various high impact plastics, resins, carbon fiber composites, wood, or other materials having suitable characteristics. In particular, materials that are of similar strength in tension and compression are favorable for the sheering loads expected for the various frame members. Additionally, in embodiments where tubular material is used, regardless of the cross-sectional profile, weep holes may pierce through the various frame members, allowing water to drain out, thus preventing accumulation of moisture and corrosion. In other embodiments, the ends of the tubular frame elements may be sealed with any of various watertight foams and resins, preventing the interior from wetting, and thus preventing corrosion.

FIG. 2 displays a storage panel 204 in place on the watercraft 100. FIG. 3 includes the subcomponents of the storage panel 204. The storage panel 204 includes a bottom section 204A, which supports various stored items. A storage panel drain 204B may be positioned centrally, or multiple drain holes 204B may be present. The drain holes 204B prevent water from accumulating on top of the storage panel 204. Storage panel support loops 204C may be present along the lengthwise sides of the storage panel 204. In various embodiments, the storage panel support loops 204C accommodate the inner lengthwise frame members 220. A storage panel support loop gap 204D may be left centrally in the storage panel support loops 204C to accommodate the centrally and inwardly positioned straps 116, which also receive support from the inner lengthwise frame members 220. Storage panel beamwise verticals 204F line the storage panel 204 forward and aft, and are operable to prevent stored items from falling out of the watercraft 100 either forward or aft. The storage panel 204 may be made of a canvas or other woven fabric material. Where natural fibers are used, any of various water resistance treatments may be applied. Alternatively, synthetic fibers may be used in an impervious or nonabsorbent woven material.

Figure 17:
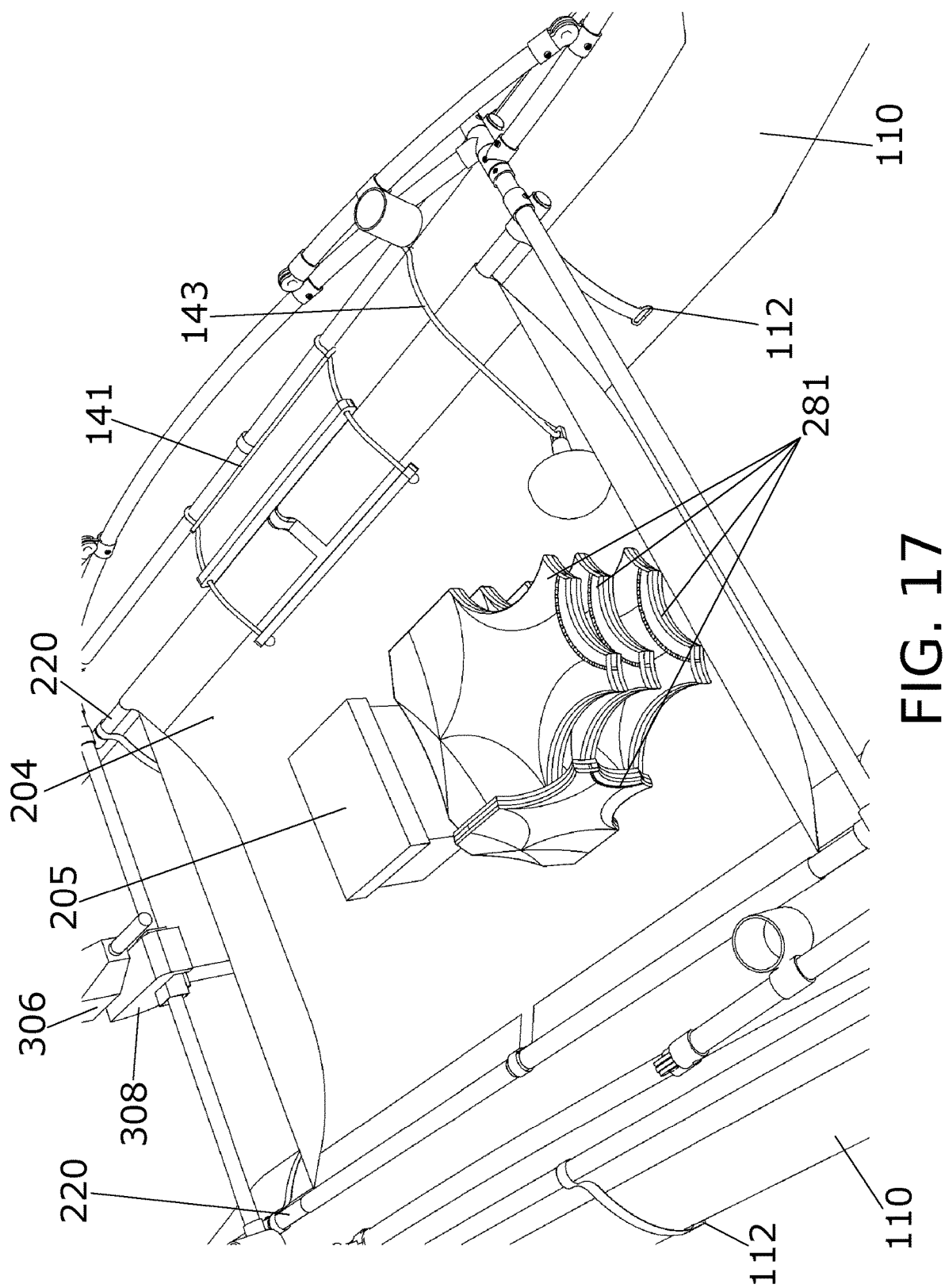
FIG. 17 is an elevated forward starboard perspective view of a watercraft with the seat panel removed, in accordance with at least one embodiment of the invention.

FIG. 17 depicts how the storage panel 204 may store various items. A battery box 205 rests on the storage panel 204 and may be strapped around support 222 for additional stability. The battery box 205 may be understood as a waterproof container for various electrical components. Forward of the battery box 204 may be stored life jackets 281. An optional anchor 143 may be stowed, as shown. The anchor 143 includes an anchor line loop 143A, which may be tied around one of the outer lengthwise frame members, as shown, or another frame element. The anchor 143 further includes an anchor cup 143B, which may grab sand, silt, dirt, or other bottom material. The depicted anchor is of a style that lacks sharp points and edges, which is beneficial to avoid damage to the pontoons 110 and various fabric elements. Also stowed is shown a side ladder 141, which includes ladder line loops 141A and ladder steps 141B. The ladder line loops may be tied around the outer lengthwise frame member 120, as shown, or around another frame member. Additional items stowed in the storage panel 204 may include paddles, life vests, fishing tackle, tools, and flotation toys.

Figure 4:
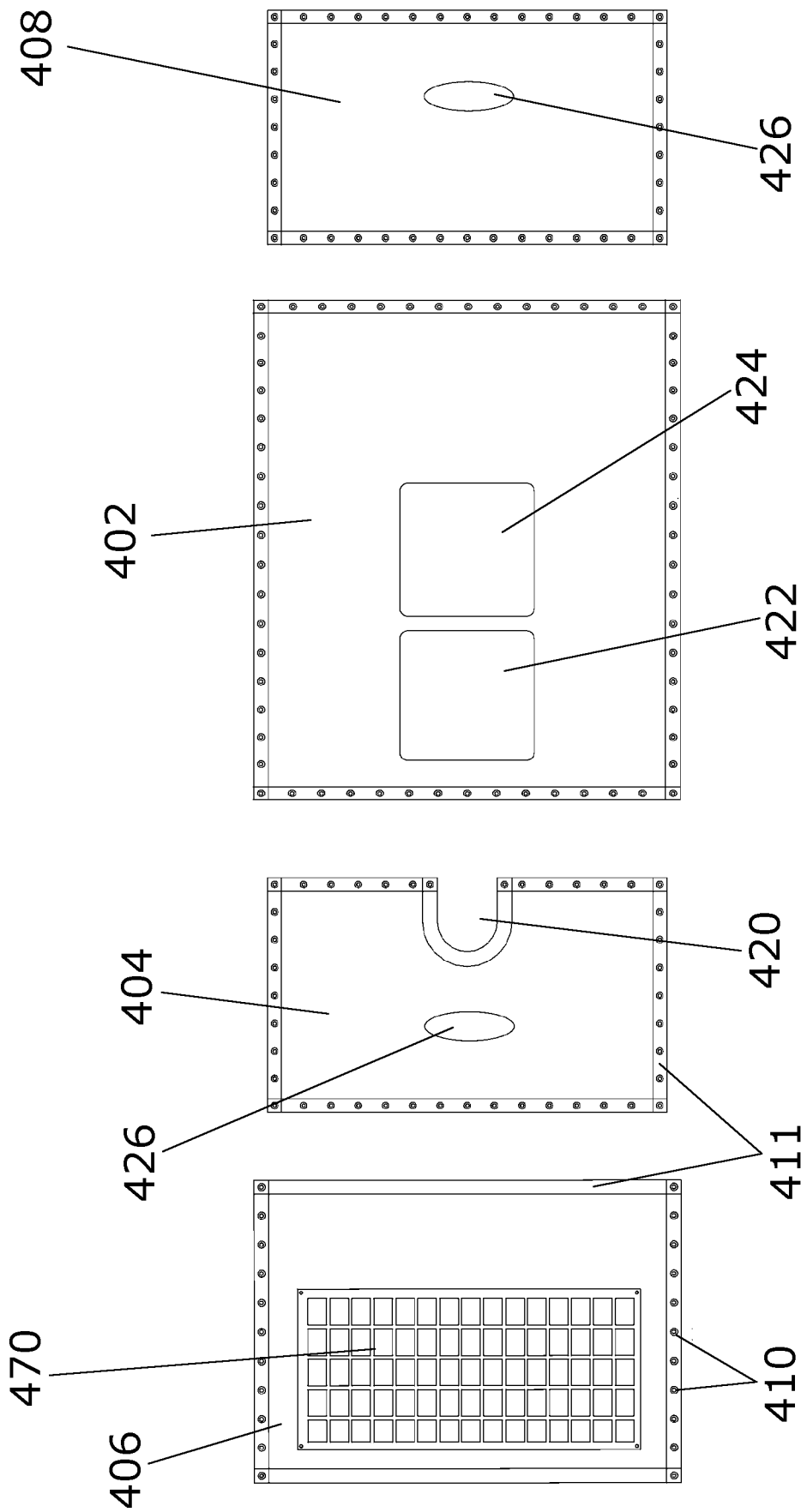
FIG. 4 is a plan view of various fabric panels for a watercraft, according to at least one embodiment of the invention.
Figure 7:
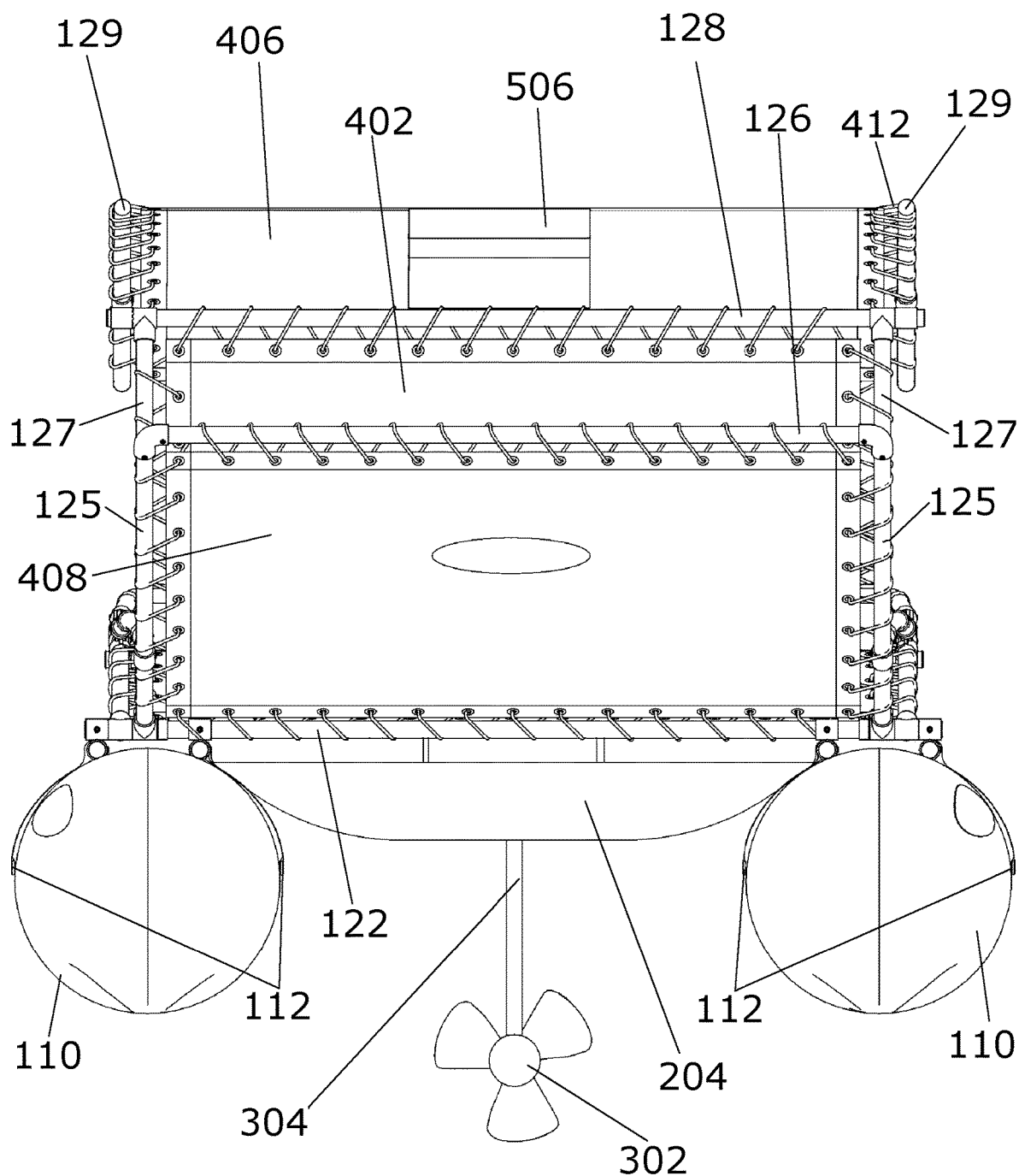
FIG. 7 is a forward portrait view of a watercraft, according to at least one embodiment of the invention.
Figure 8:
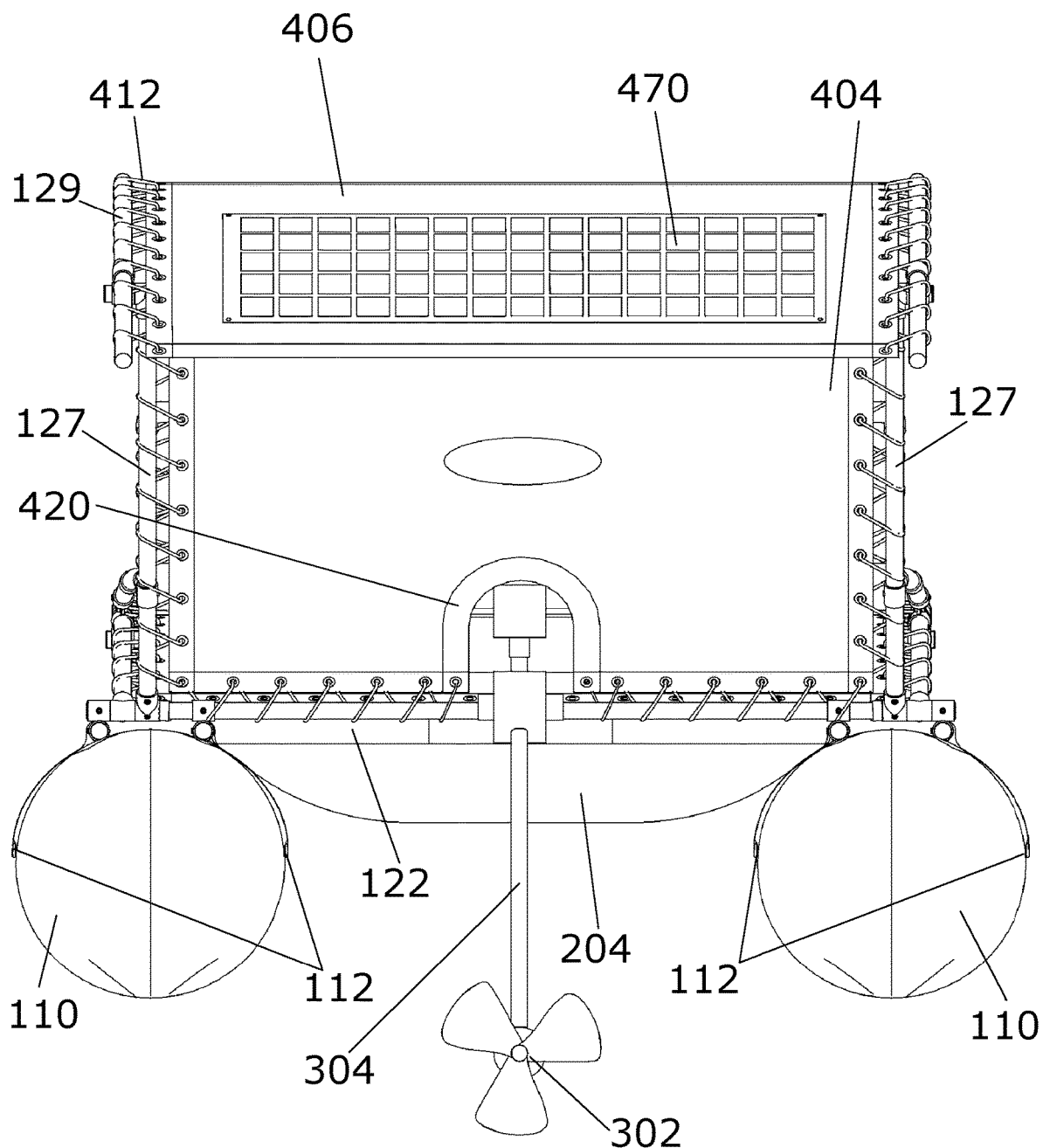
FIG. 8 is an aft portrait view of a watercraft, according to at least one embodiment of the invention.
Figure 9:
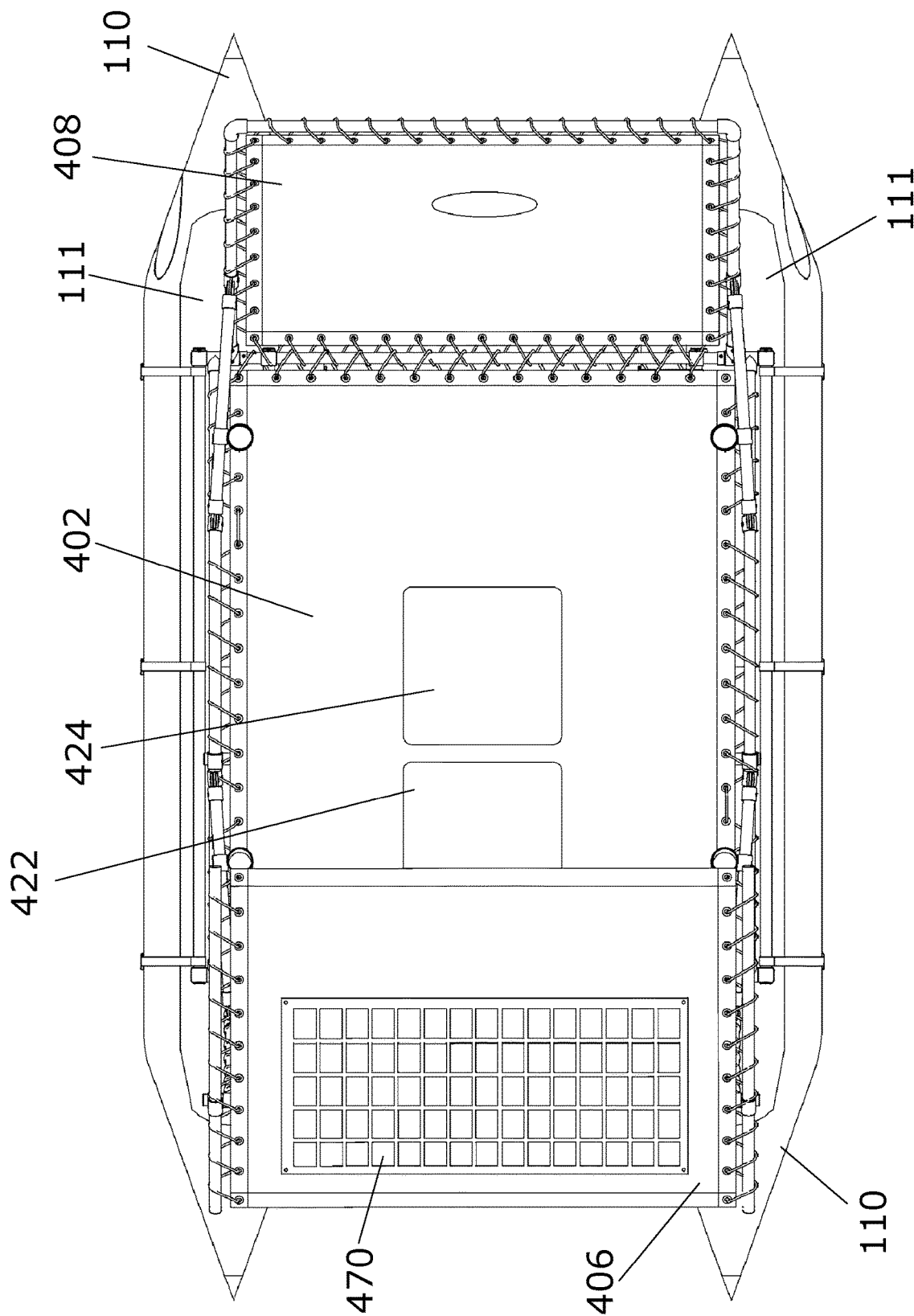
FIG. 9 is a top view of a watercraft, according to at least one embodiment of the invention.

Referring now to FIG. 4, FIG. 4 is a plan view of various panel elements for a watercraft 100, according to various embodiments of the invention. A main panel 402 may be stretched between the primary arch frame members 130, the forward beamwise frame member 122, and the aft beamwise frame member 123. The main panel 402 may include an aft access flap 422 and a forward access flap 424, which may be pulled back to reveal holes for accessing below the main panel 402. An aft panel 404 may be stretched between the aft beamwise frame member 123, the aft panel top member 128, and the aft panel side members 127. In the depicted embodiment, the aft panel 404 includes a tiller gap 420, in the shape of an arched doorway, to accommodate the tiller and throttle control of the watercraft 100, described in further detail below. A Bimini top panel may be stretched between the Bimini top frame members 129 (the forward and aft edges of the Bimini top panel 406 may be left unsecured). The Bimini top panel may include, affixed to its top surface, a flexible solar panel 470, discussed in further detail below. A forward panel may be stretched between the forward beamwise frame member 120, the forward panel top member 126, and the forward panel side members 125.

The various panel elements: main panel 402, aft panel 404, Bimini top panel 406, and forward panel 408, may be made of a canvas or other woven fabric material. The forward panel 408 and aft panel 404 may be made of or include a substantial section of air-permeable mesh material, which is effective to allow airflow to and from passengers on the watercraft. Where natural fibers are used, any of various water resistance treatments may be applied. Alternatively, synthetic fibers may be used in an impervious or nonabsorbent woven material. Any of the various panel elements, but in particular the forward panel 408 and aft panel 404, as shown, may bear an indicia patch 426, which may include a logo or mark of the manufacturer or seller of the watercraft 100, or other indicia. Each of the various panel elements may include a reinforced edge 411, and attached edges may include a row of grommet holes 410. In various embodiments, the various panel elements may be secured to their various frame elements by lashing with cordage 412 (FIG. 1). The cordage may be parachute cord, or also may be any of various synthetic and natural fiber rope materials. In some embodiments, the grommet holes 410 may be significantly larger in diameter than the cordage, allowing for several passes through individual grommet holes. In particular, corner grommet holes 410 may be secured to both immediately adjacent frame members in a 90° lashing configuration. For central grommet holes 410, the cordage 412 may be looped through the hole and around the frame member fewer times, or only once, as shown.

Figure 18:
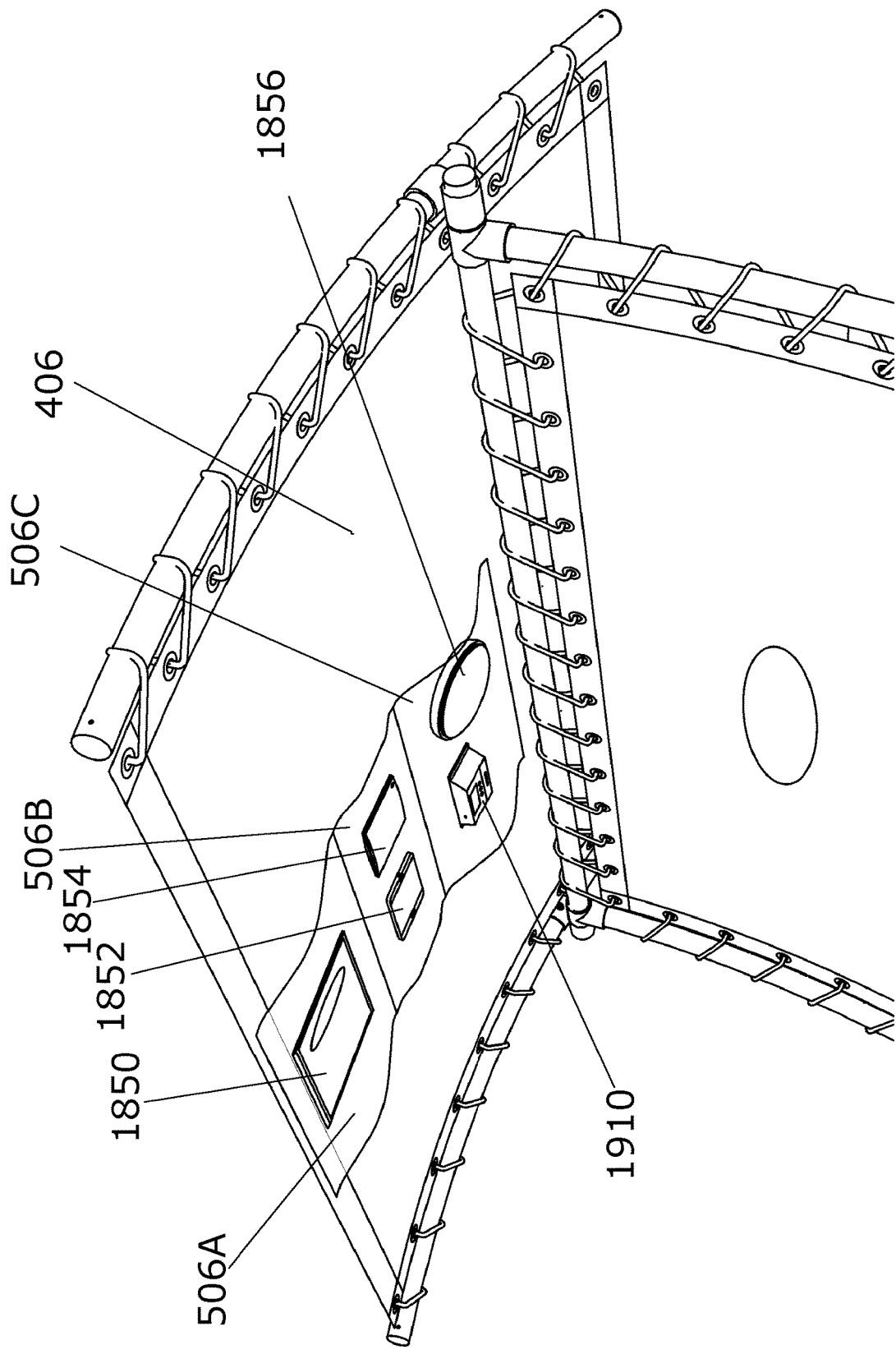
FIG. 18 is a lowered port amidships perspective view to the underside of the Bimini top of a watercraft, in according with at least one embodiment of the invention.

Referring now to FIG. 5, FIG. 5 shows the underside of the Bimini top panel 406, according to at least one embodiment of the invention. Affixed below the Bimini top panel 406 is a Bimini panel pocket element 506, which may be made of a transparent and water-permeable mesh material, which allows users to see the contents thereof and water to drain therethrough. The Bimini panel pocket element 506 may, as shown, be divided into a forward Bimini panel pocket 506A, a central Bimini panel pocket 506B, and an aft Bimini panel pocket 506C. A solar controller 1910, discussed in further detail below, may be mounted within/behind the aft Bimini panel pocket 506C. FIG. 18 depicts various items that may be stowed in the Bimini panel pocket 506, such as documents 1850, portable electronic device 1852, wallet 1854, and wireless speaker 1856.

Figure 20:
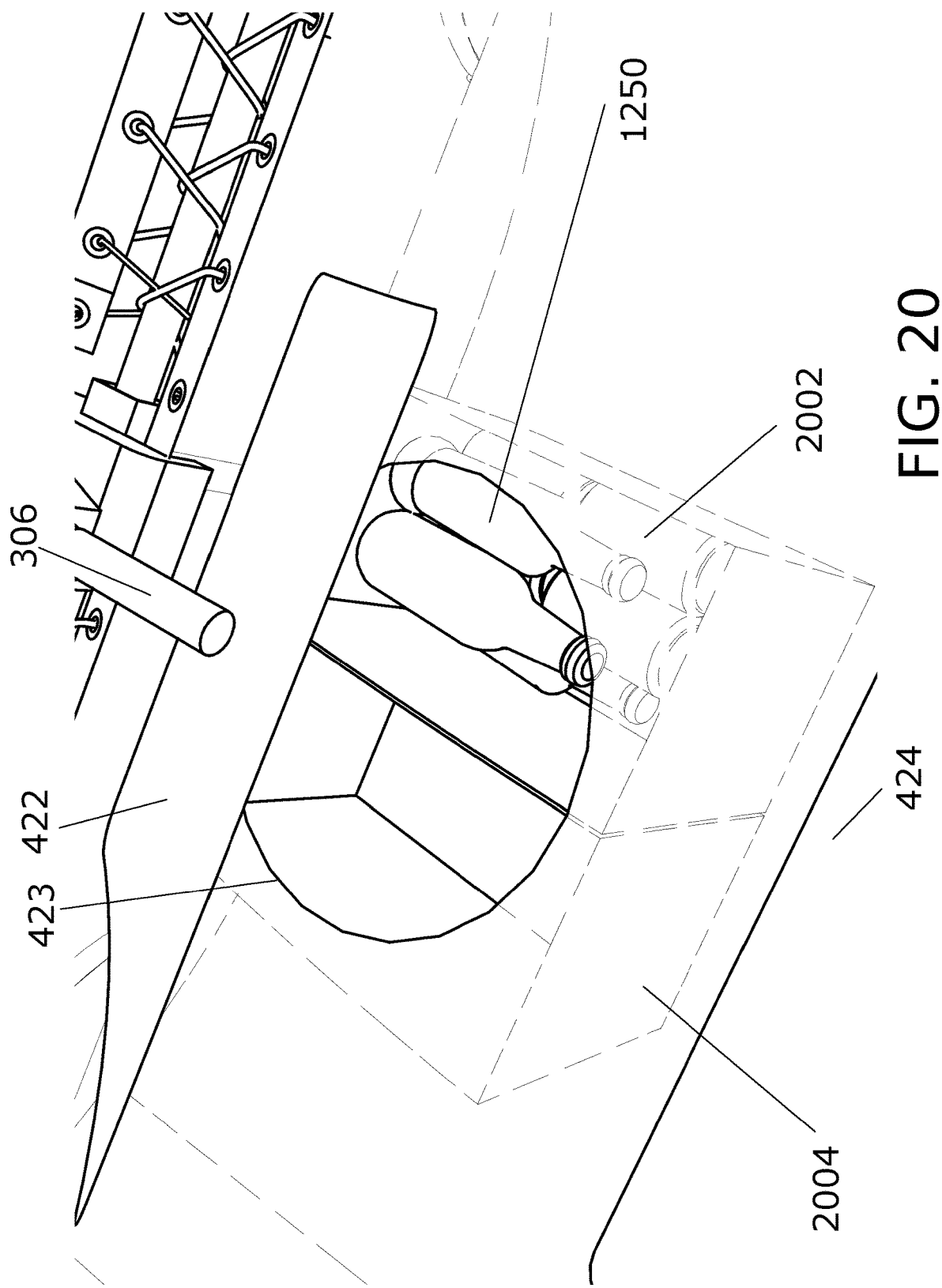
FIG. 20 is an elevated port amidships perspective view to the storage container of a watercraft, in according with at least one embodiment of the invention.

Referring now to FIG. 6, FIG. 6 is a side view of the main panel 402, according to at least one embodiment of the invention. Suspended from the main panel 402 may be a container 600. FIG. 20 provides a view of the container 600. In FIG. 20, the aft access flap 422 is lifted up to reveal the aft access hole 423 through which is accessed the container 600. The container 600 may be made of an insulating and/or watertight material. In the depicted embodiment, the container 600 is divided into a closed compartment 2004 and an open compartment 2002. The closed compartment 2004 may lack any drainage, suitable for storage of dry items such as dry foodstuffs or paper books. In fishing applications, the closed compartment 2004 may be filled with water to be used as a wet well, or as live bait storage. In FIG. 20, the open compartment is shown storing beverage bottles 1250, with the drainage suitable for removing excess condensation, spills, melting ice, etc.

Figure 19:
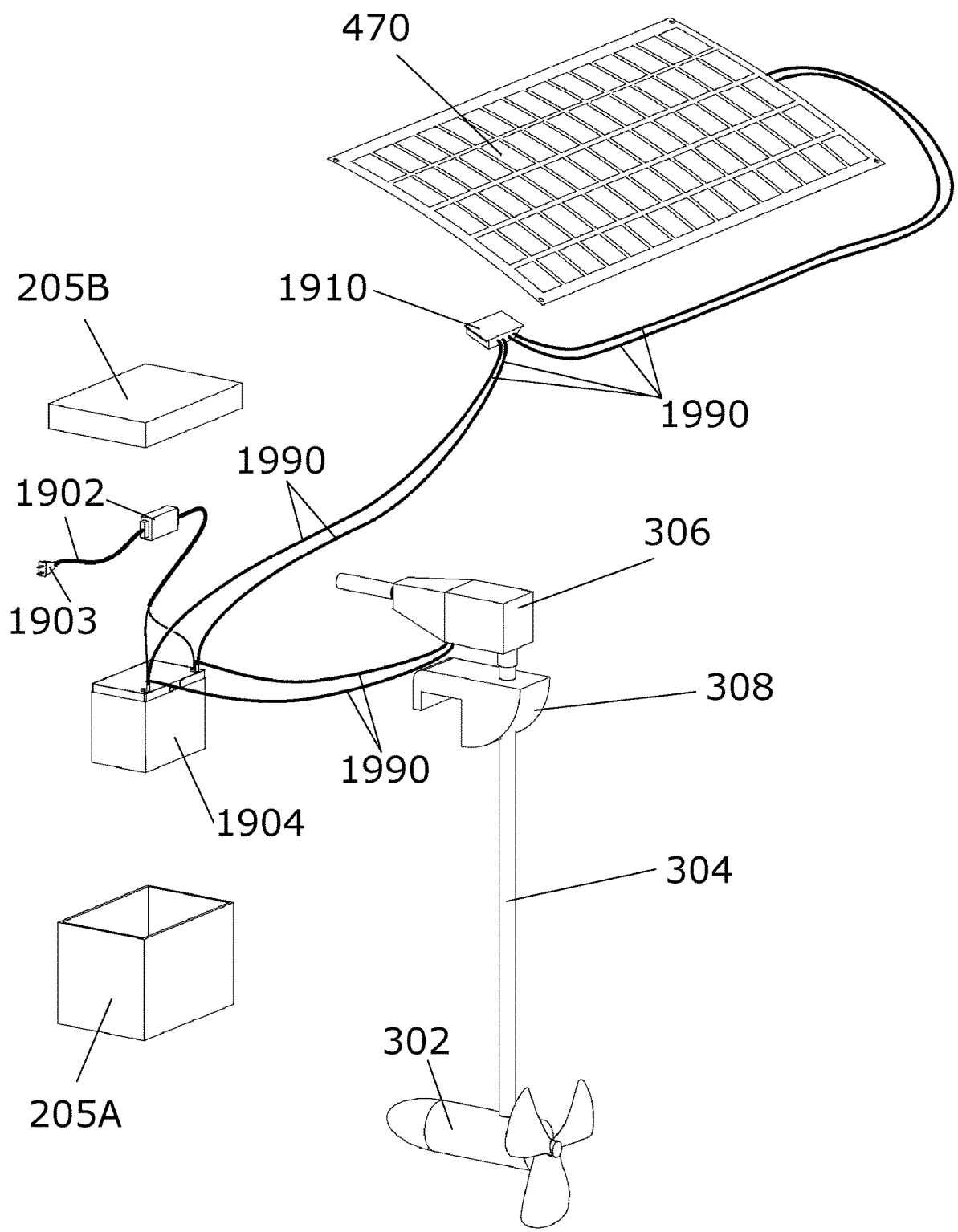
FIG. 19 is a perspective view of various isolated electrical components for a watercraft, in accordance with at least one embodiment of the invention.

Referring now to FIG. 19, FIG. 19 depicts the various electrical components of the watercraft 100, according to at least one embodiment of the invention. Electric motor 302 may be an off-the-shelf electric trolling motor, suspended in the water on motor vertical member 304. The Inventor has observed/recognized that it is advantageous in some embodiments for the motor vertical member 304 to be long such that the motor 302 is positioned below the depth of the pontoons 110. This configuration was observed to avoid the drawback of thrust from the motor 302 being deflected or absorbed by the pontoons 110. The motor vertical member 304 extends down through, is supported from, and pivots within a motor mount 308. In general, the motor mount 308 may be configured to affix to the aft beamwise frame member 123. In the depicted embodiment, the motor mount 308 includes a complementary receiving shape to fit a rectangular motor mount point 124 that is positioned centrally on the aft beamwise frame member 123 (that is, approximately at the linear center of the aft beamwise frame member 123). Above the motor mount 308 is a tiller 306. The tiller 306 may be rotated to change the direction of the motor 302. In various embodiments, the tiller 306 includes a throttle control configured to adjust the speed and/or direction of the motor 302. The inventor has observed/recognized that the tiller and throttle controls provide a low learning curve that can be mastered quickly by anyone, including children.

Referring still to FIG. 19, leads 1990 connect the tiller 306 (which may be configured to power the entire motor/tiller assembly 300), to the terminals of a battery 1904, which sits inside the battery box 205. In some embodiments, the battery box 205 includes external terminals and/or sockets (e.g., +/−12V DC car charger socket), allowing the battery box 205 to remain closed. A transformer 1902 with AC plug 1903 may be provided to charge the battery 1904 from conventional grid power or generator. In some embodiments, the battery and conventional charging transformer are sufficient to operate the watercraft 100, and no solar electric system is provided. In some embodiments, a solar energy system is provided, but the solar controller 1910 may be located not in the bimini aft panel pocket 506C, but collocated with the transformer 1902, for example both may be affixed to a board stowed in in the storage compartment 204. In the depicted embodiment, leads 1990 connect the terminals of the battery 1904 to the solar controller 1910, which in turn is connected by leads 1990 to the solar panel 470. The solar controller 1910 may be an off-the-shelf component configured to regulate and direct power coming off of the solar panel 470 towards usefully charging the battery 1904. The solar panel 470 may generally be of any flexible photovoltaic technology, including but not limited to amorphous silicon, cadmium telluride, copper indium gallium selenide, and organic photovoltaic cells. In addition to the above, +5V DC USB ports may be provided via either the battery box 205 or incorporated into the solar controller 1910, or both. The battery box is proximate to chargeable items stored in the storage compartment 204, and the solar controller is proximate to chargeable items stored in the Bimini pocket 506, such as the portable electronic device 1852 (FIG. 18). In addition to the above, a portable air compressor may be configured to inflate and/or deflate the pontoons 110 and be configured to use 12V DC current from the battery 1904. Such a compressor may be provided as an accessory and stored in storage panel 204, or the compressor may be incorporated into the battery box 205. Additionally, a charge indicator, volt meter, galvanometer, or other measurement device for the estimation of battery charge may be incorporated into the battery box 205 or incorporated into the trolling motor assembly 300.

Figure 10:
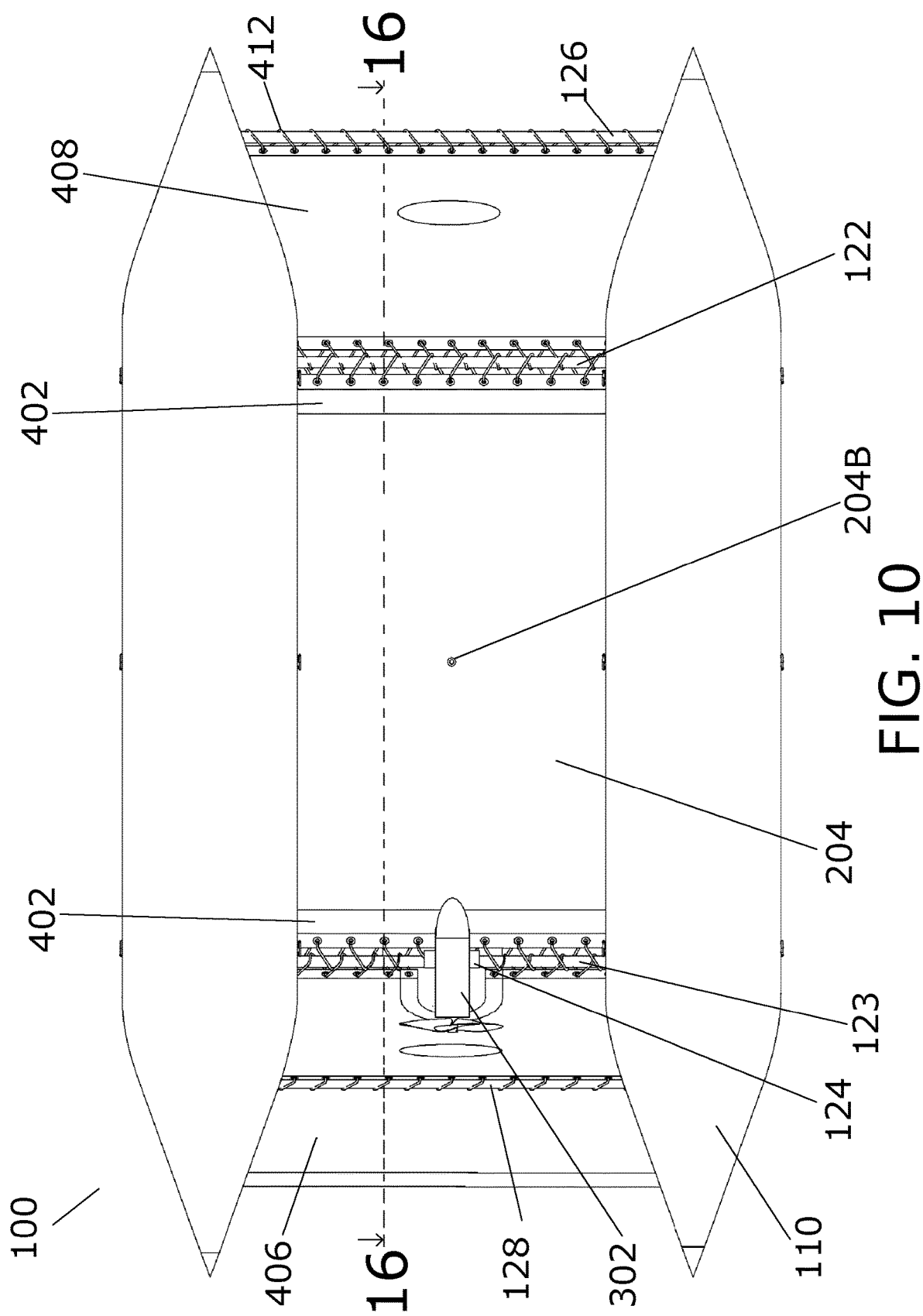
FIG. 10 is a bottom view of a watercraft, according to at least one embodiment of the invention.
Figure 11:
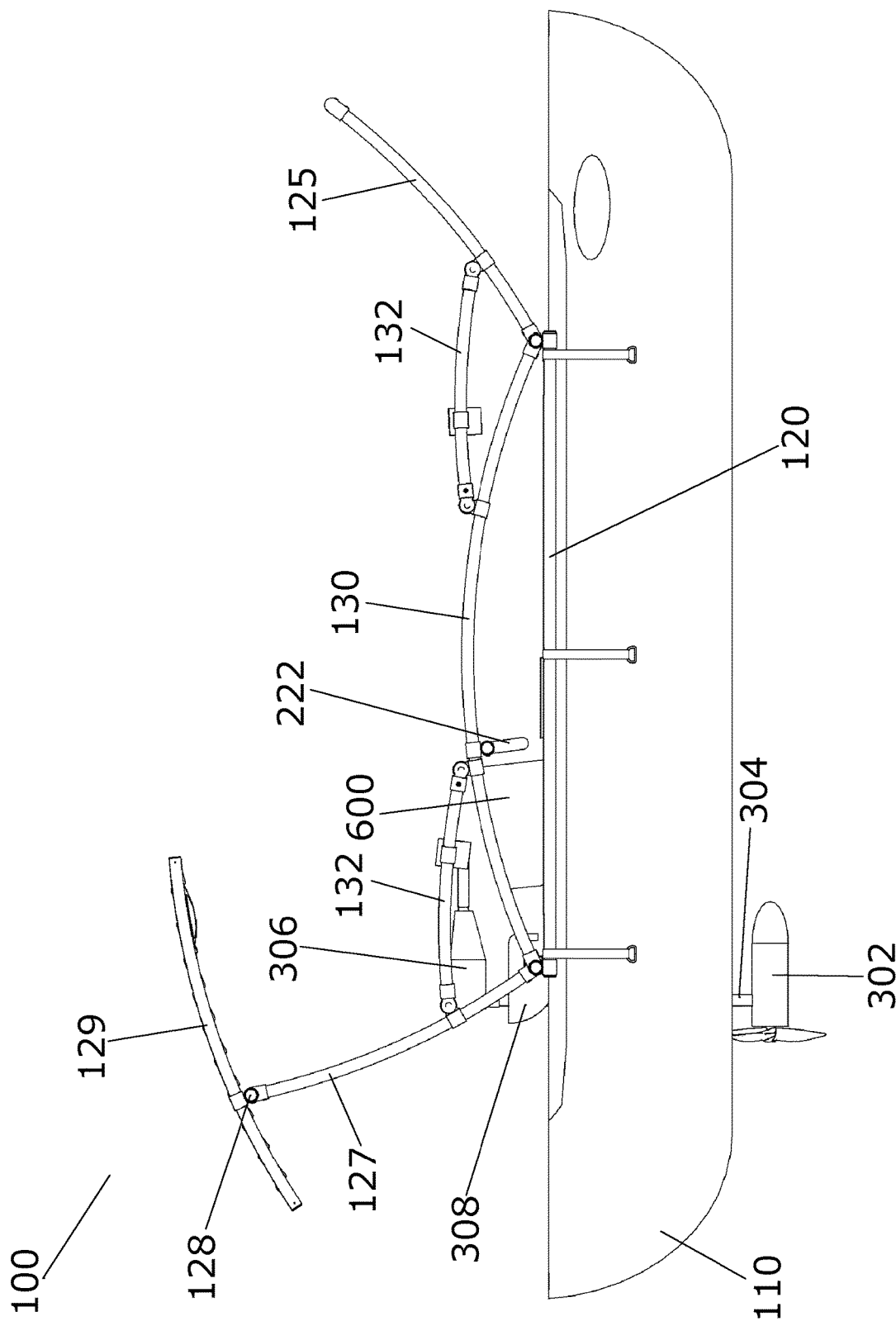
FIG. 11 is a starboard side profile view of a watercraft, according to at least one embodiment of the invention.
Figure 16:
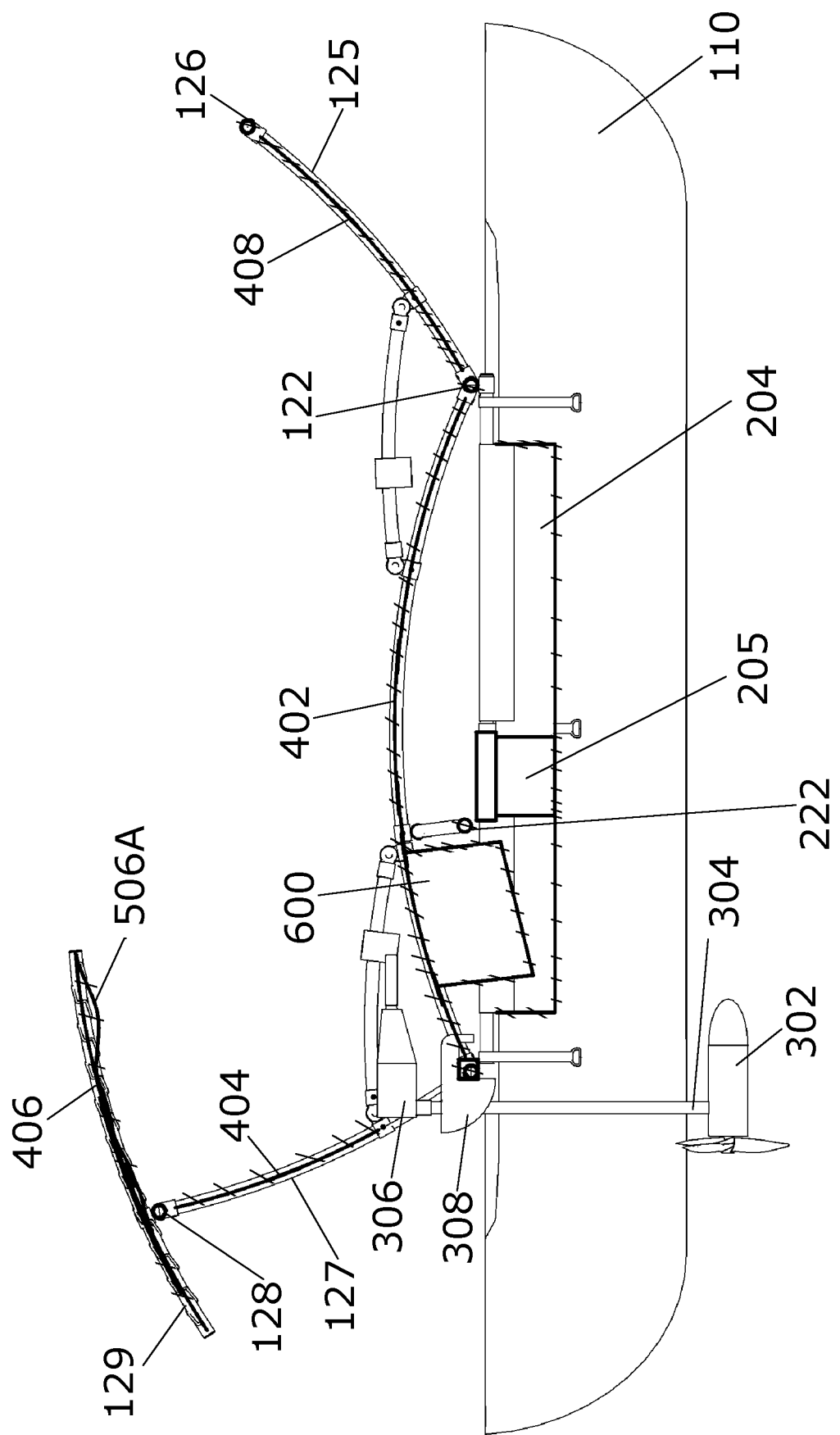
FIG. 16 is a starboard profile sectional view, according to the sectional plane designated in FIG. 10, of a watercraft, an accordance with at least one embodiment of the invention.

Referring now to FIGS. 7-10, FIGS. 7-10 provide various additional views of the watercraft 100 as described above. FIG. 10 includes the sectional line of FIG. 16, which shows a lengthwise sectional view of the watercraft 100, including the various components described above.

Figure 12:
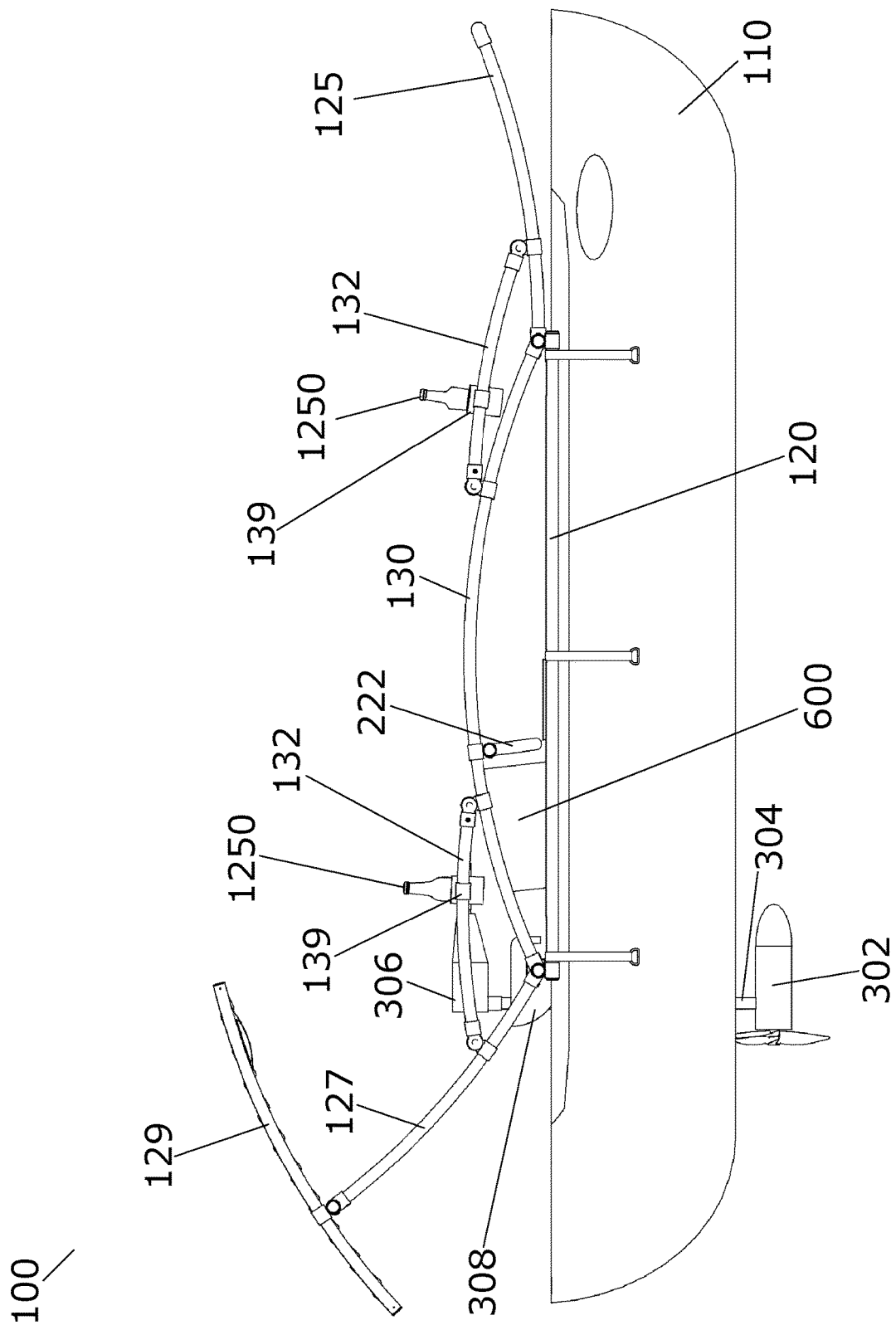
FIG. 12 is a starboard side profile view of a watercraft in a reclined configuration, according to at least one embodiment of the invention.
Figure 13:
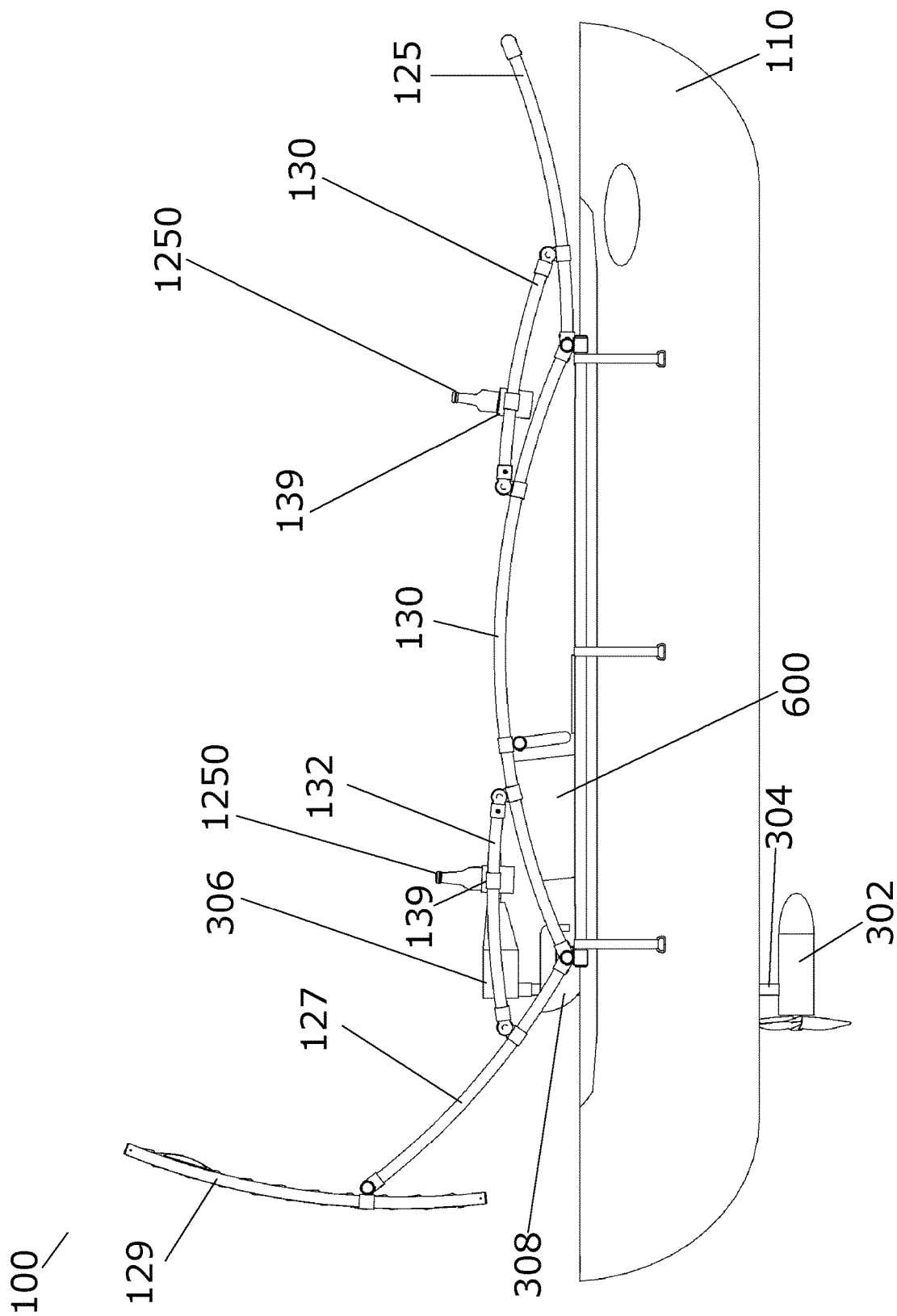
FIG. 13 is a starboard side profile view of a watercraft in an open configuration, according to at least one embodiment of the invention.
Figure 14:
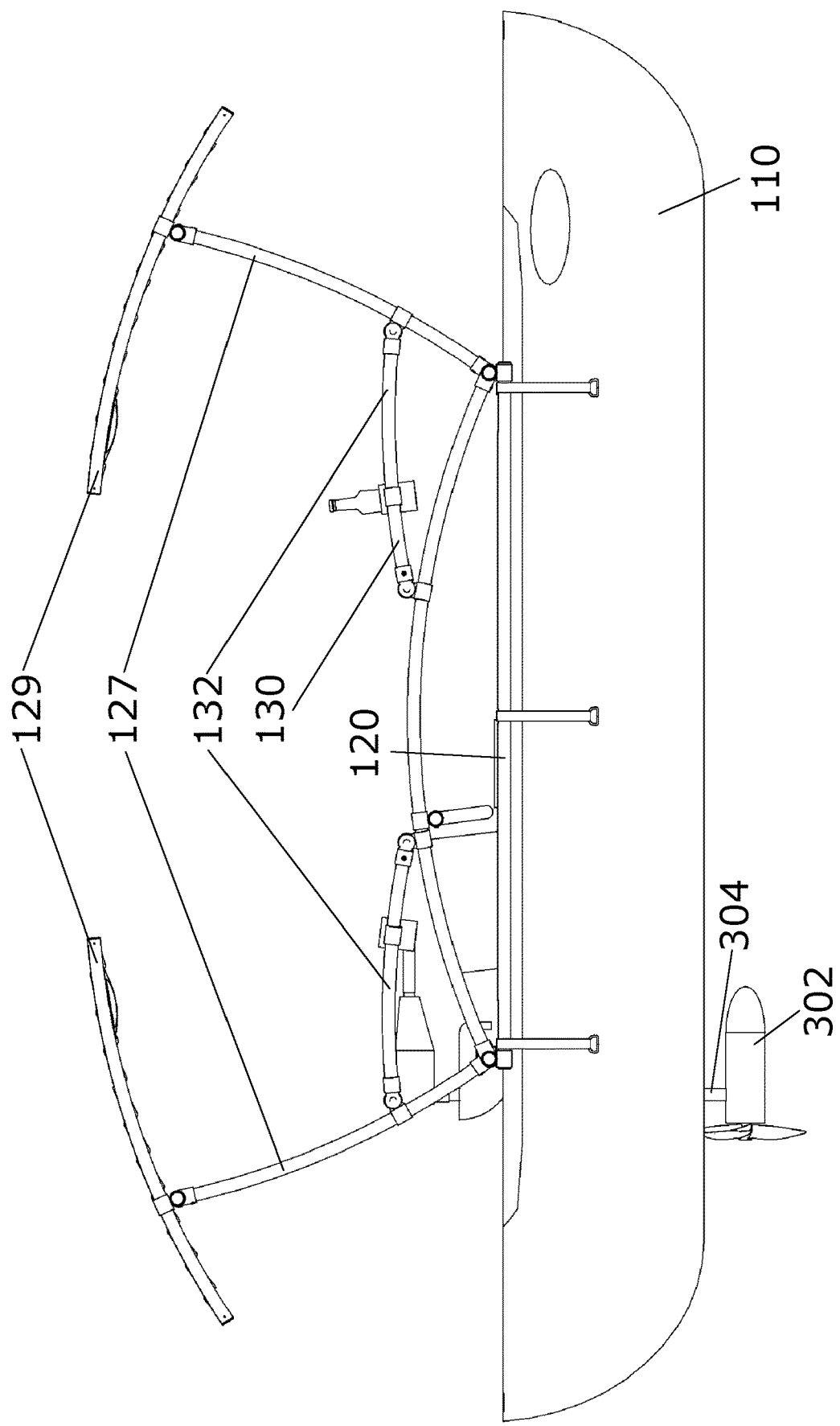
FIG. 14 is a starboard side profile view of a watercraft in a configuration with two Bimini tops, according to at least one embodiment of the invention.

Referring now to FIGS. 11-15, FIG. 11 provides a side profile view of the watercraft 100 in the configuration described in most detail above. FIG. 12 provides a view of the watercraft 100 in a comparatively reclined configuration with the contemplated application being lounging or sunbathing. In the configuration of FIG. 12, beverage holders 139 are mounted to any of the secondary arch frame members 132, and beverage containers 1250 are placed therein. To achieve reclining in the configuration of FIG. 12, the aft panel side members 127 are pushed aft, leaving the Bimini top members 129 angled relatively upward. The forward panel side members 125 have similarly been pushed forward. The secondary arch frame members 132 have been slid and angle adjusted to accommodate these changes. FIG. 13 provides a variant configuration from that of FIG. 12 wherein the Bimini top members 129 have been angled more aft/upward to accommodate a user standing up, for example to swim or dive.

Figure 15:
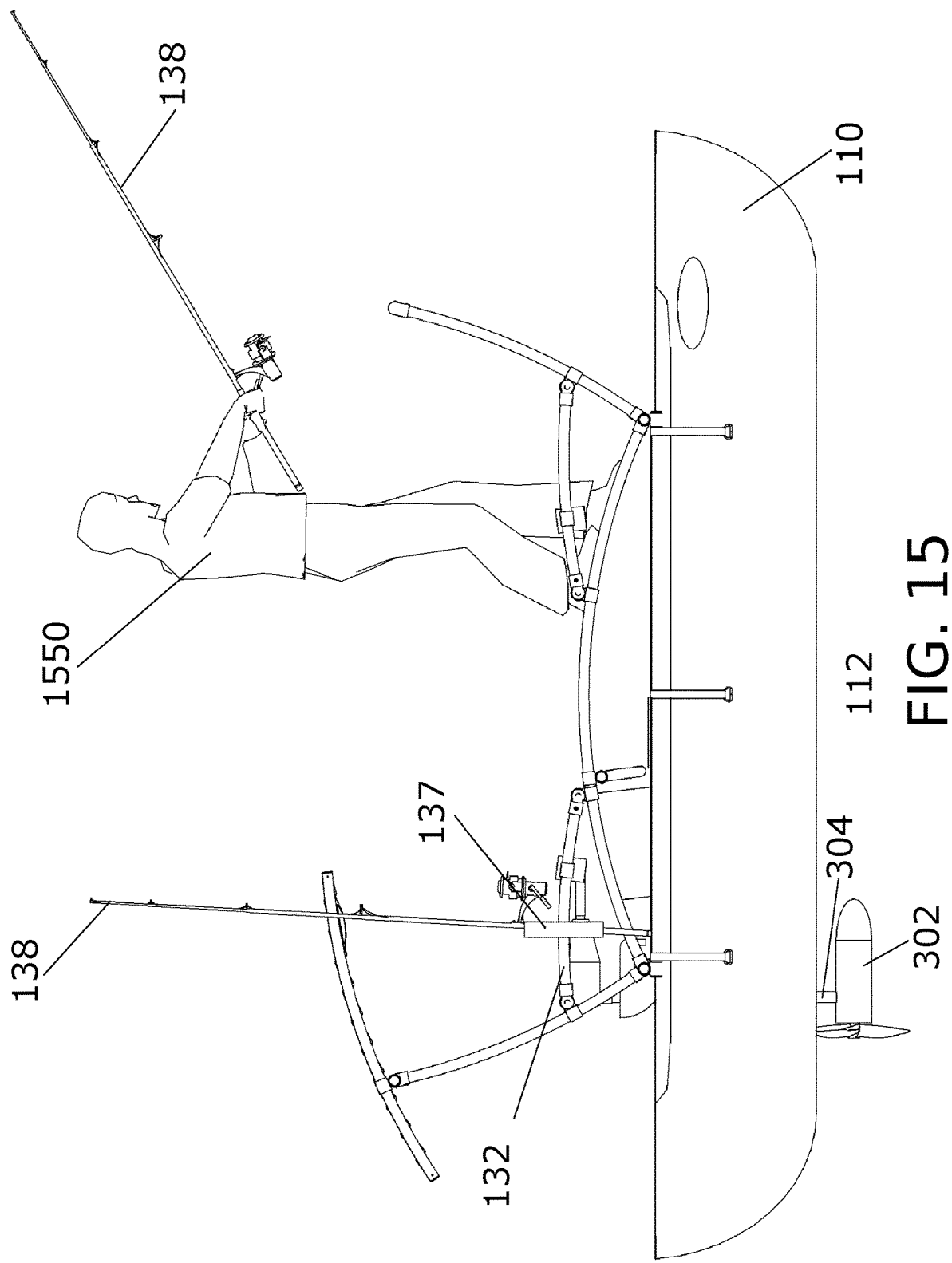
FIG. 15 is a starboard side profile view of a watercraft in a fishing configuration, according to at least one embodiment of the invention.

Referring still to FIGS. 11-15, FIG. 14 depicts a configuration in which two Bimini tops are provided. Additional Bimini top frame members 129 are affixed to the forward panel top member 126 (with the joints changed from tubular corner connectors 198 to tubular right-angle connectors 192). An additional fabric panel may be stretched between the additional Bimini top frame members 129, but this additional panel need not, but may still, incorporate an additional solar panel 470 or solar controller 1910. FIG. 15 depicts the watercraft 100 in a fishing-oriented configuration with fishing rod holder 137 affixed to the secondary arch frame member 132. A fishing rod 138 sits in the fishing rod holder 137. A Fishing user 1550 stands (which is expected to be supportable by the main panel 402) to use an additional fishing rod 138.

Figure 21:
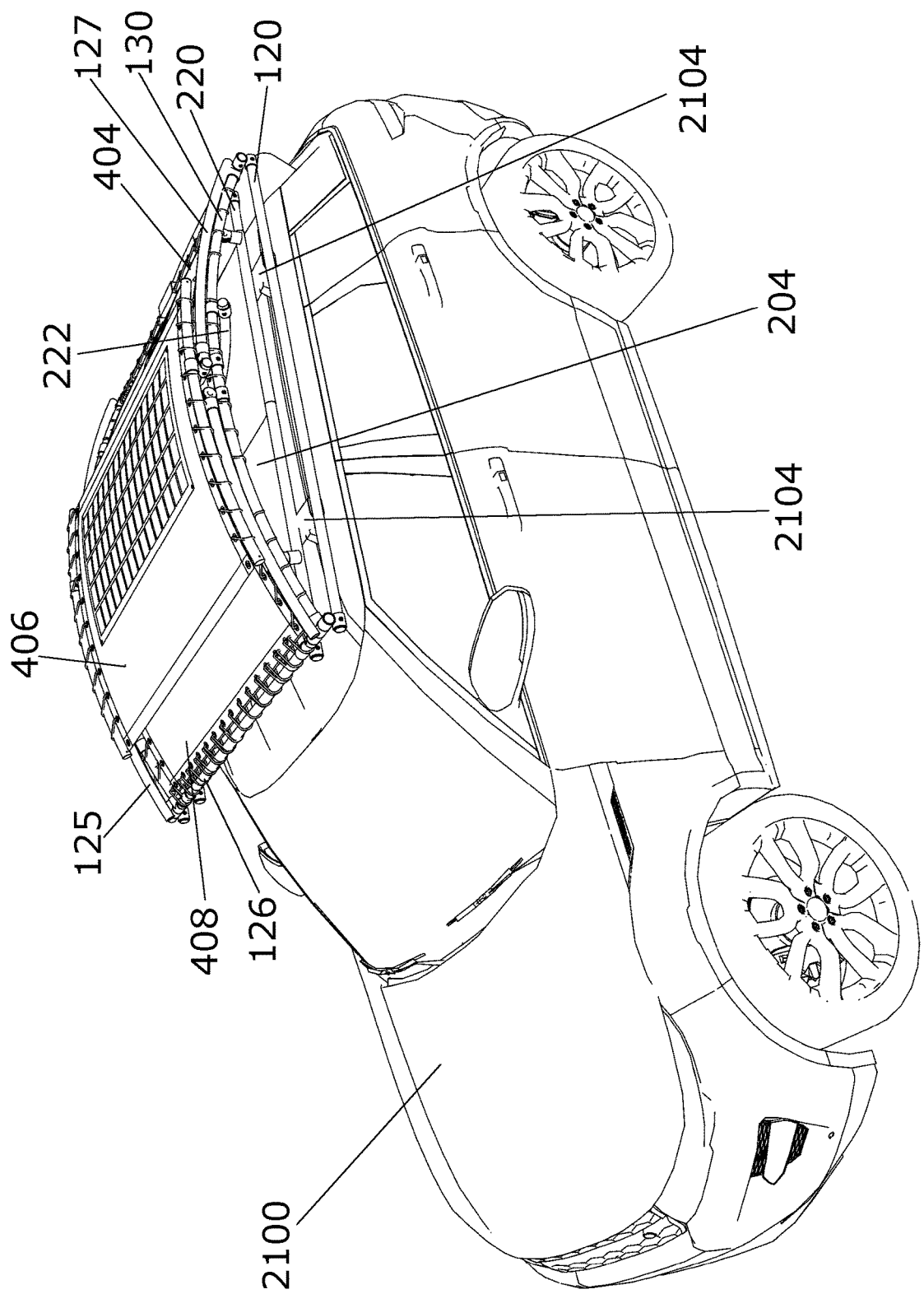
FIG. 21 is an elevated perspective view of a watercraft configured for stowage and transport on a land vehicle, in according with at least one embodiment of the invention.

Referring now to FIG. 21, FIG. 21 depicts how the watercraft 100 may be placed in a stowage/transport configuration for transport without a trailer. A land vehicle 2100, such as a car, sport utility vehicle, or light truck (in general, any motor-driven, self-propelled land vehicle, specifically excluding conventional boat-carrying trailers), is equipped with a roof rack 2104. The watercraft 100 has the pontoons 110 removed as well as the motor assembly 300 and batter box 205. The remaining frame-and-panel assembly may be folded as shown, for example by loosening and sliding/rotating the various frame components as described above. In an embodiment, the folded frame components may fit into a volume of dimensions 8"h×5'w×7'd. The assembly may then be tied, bungeed, or latched to the roof rack 2104. The deflated pontoons 110, battery, and other removed components may be transported in the trunk or cabin of the vehicle 2100.

More particularly, the watercraft of various embodiments may be understood as being foldable into a first operational configuration (e.g., FIG. 1) and a second transport configuration (e.g., FIG. 2). The first operational configuration may be defined as including releasably affixing the inflatable pontoons 110 below one of the inner lengthwise frame members 220 and one of the outer lengthwise frame members 120 with buoyant forces opposing loads, as discussed above. The first transport configuration may further be understood to include removably mounting the electric trolling motor 302 centrally to the aft beamwise frame member 123. By contrast, the second transport configuration may be understood to include removing the pair of inflatable pontoons 110 and motor 302. The pontoons and motor may be carried (that is, with the motor disassembled and pontoons deflated) in the land vehicle interior, trailer, or other cargo compartment. Further, the second transport configuration may include rotating the aft panel side members 127, together with the aft fabric panel 404 and aft panel top member 128, forward until the aft panel top member is substantially in contact with the primary arch members 130. In this context "substantially in contact with" means rotated or otherwise advanced forward until stopped by the part with which contact is made. Contact may be momentary broken, for example during momentary shocks in transport, while the two components remain "substantially in contact".

Additionally, the second transport configuration may include rotating the forward panel side members 125, together with the forward panel top member 126 and forward panel 408, aft such that the forward panel top member 126 is substantially in contact with the primary arch frame members 130. As shown, the forward top panel member 126 may contact the primary arch frame members 130 slightly short of the location of the aft panel top member 128. The Bimini top frame members 129 may be rotated, together with the Bimini top fabric panel 406, aftward/upward such that the Bimini top fabric panel 406 partially covers from above both a portion of the forward fabric panel 408 and the aft fabric panel 404.

The watercraft 100, as described above, may result in various properties, depending upon the particular embodiment. For example, with the above-described configuration of twelve feet of overall length, the resulting watercraft 100 may weigh approximately 200 lbs., seat up to five passengers, with a passenger capacity of 735 lbs.

The resulting watercraft 100 may be expected to achieve speeds (relative to land) of 5-10 miles per hour, with negligible noise and wake.

Figure 22:
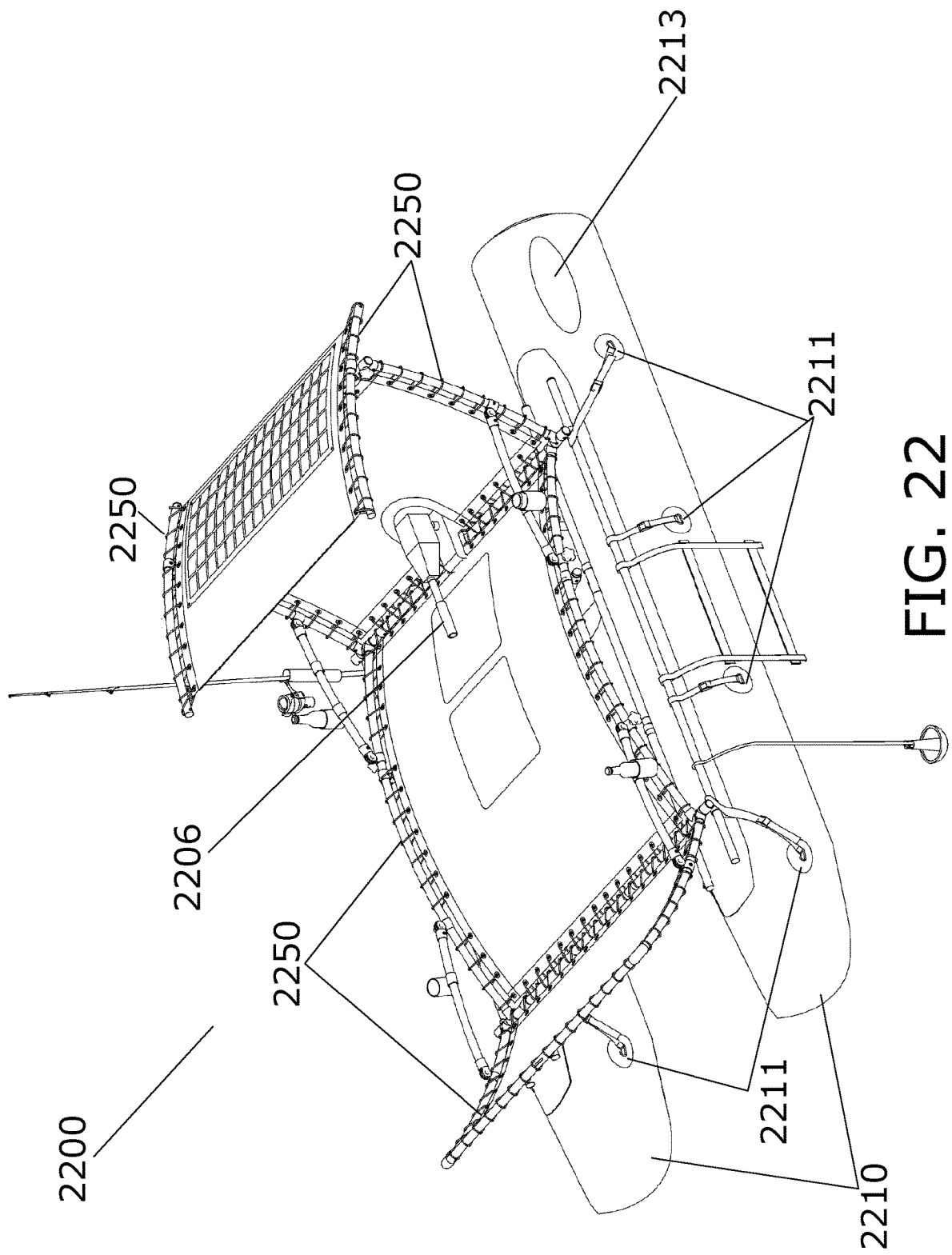
FIG. 22 is an elevated port-forward perspective view of an alternative watercraft, in accordance with at least one embodiment of the invention.
Figure 23:
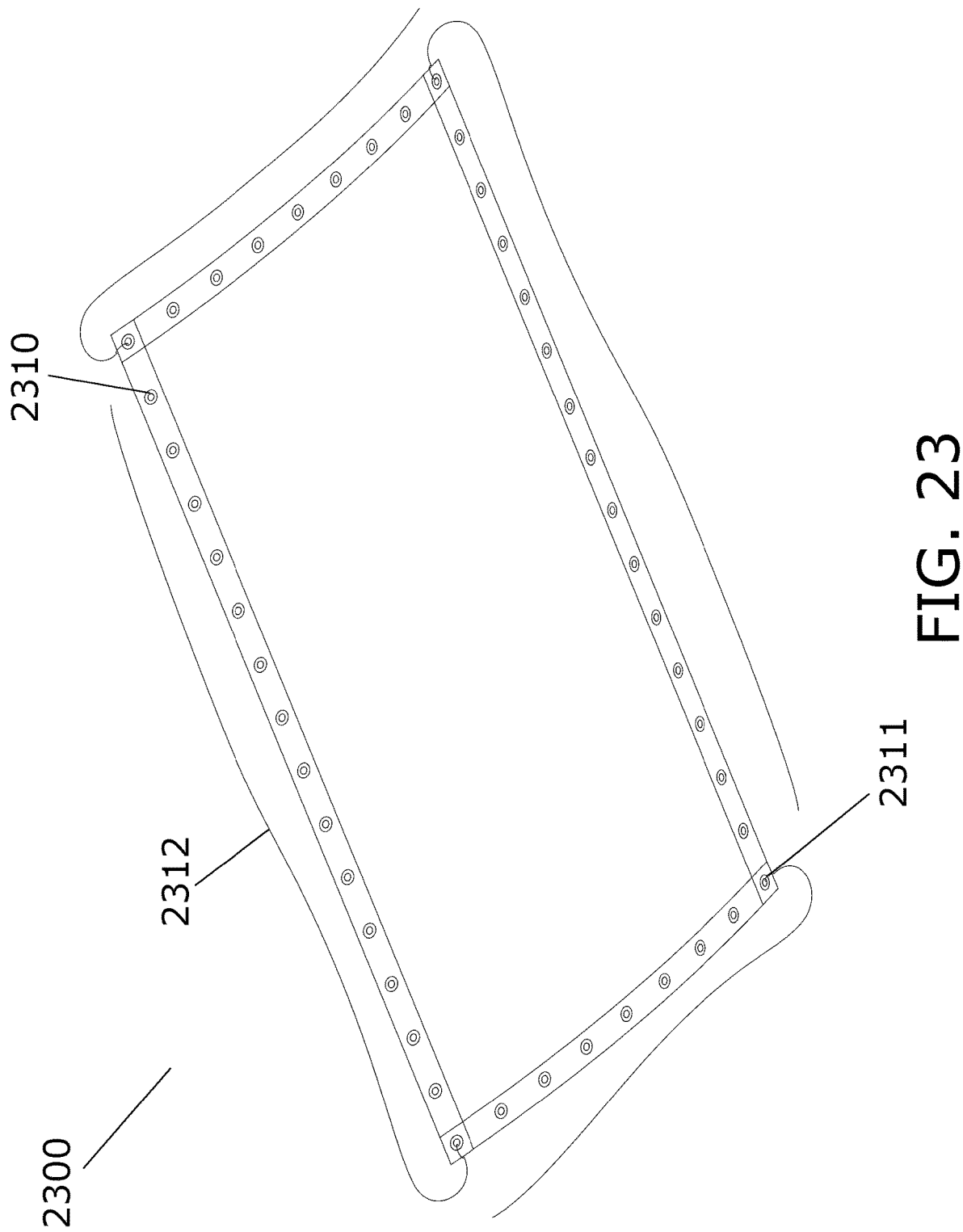
FIG. 23 is an elevated top left perspective view of a pre-strung fabric panel for a watercraft, in accordance with at least one embodiment of the invention.

Referring now to FIG. 22, FIG. 22 is an elevated port-forward view of an alternative embodiment of a watercraft according to the present invention. The alternative watercraft 2200 includes an alternative tiller 2206 that is relatively elongated as compared with the tiller 306. Alternative pontoons 2210 are less tapered on the aft end than end than pontoons 110 and include reinforced patches 2211 around D-rings 112, which are effective prevent and/or delay damage and/or failure of the inflatable material at the sites of the D-rings 112. In the alternative pontoons 2210, alternative indicia patch 2213 may be moved aft relative to indicia patch 113. Alternative cordage lashings 2250 may be applied to the various fabric elements, according to the method identified below, which has been observed by the inventor to offer improved ease of installation and resistance to failure as compared with the lashings of FIG. 1 using cordage 412.

Figure 24:
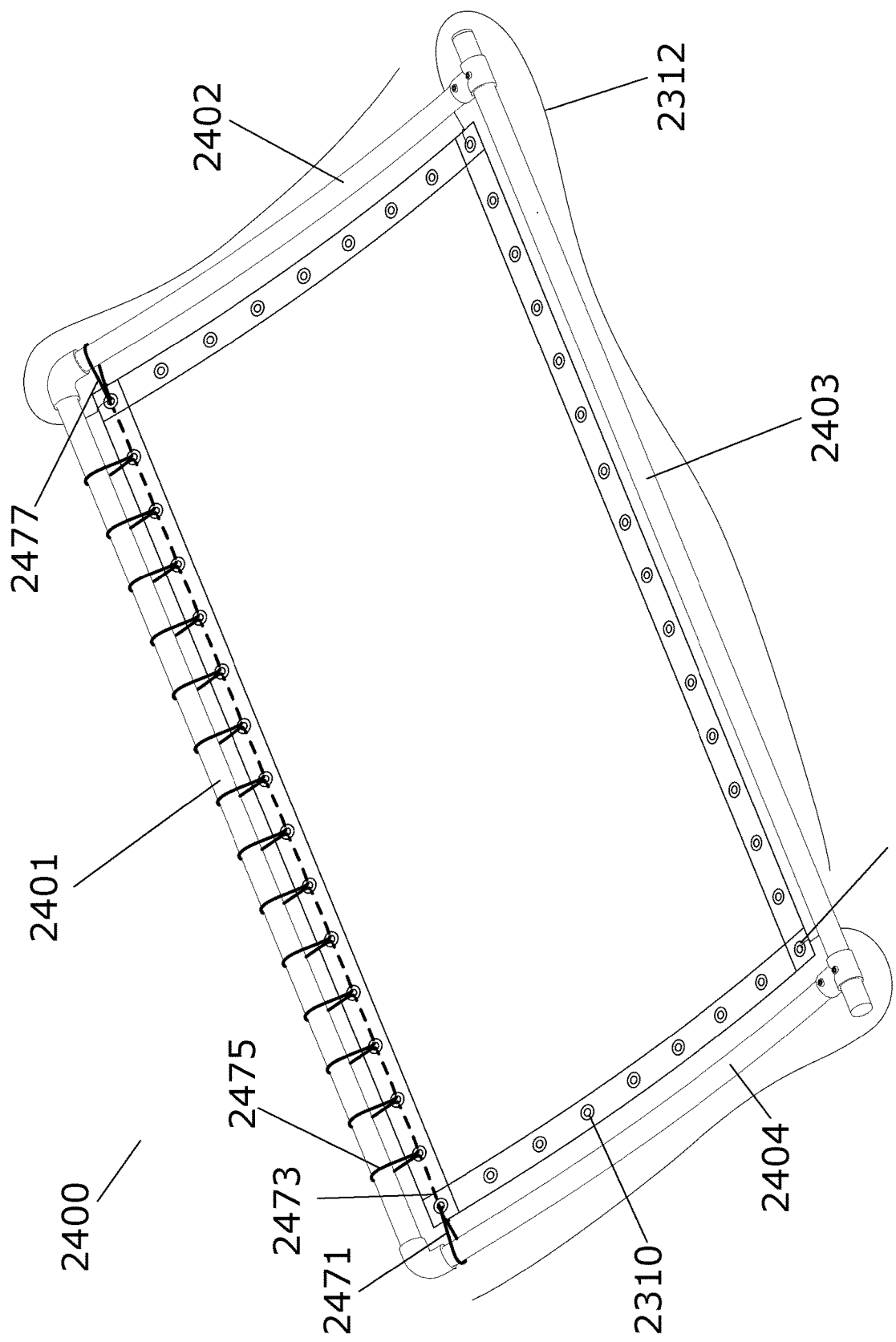
FIG. 24 is an elevated top left perspective view of a pre-strung fabric panel for a watercraft together with an exemplary frame element shown in a configuration of being laced to the exemplary frame element on a first side.
Figure 25:
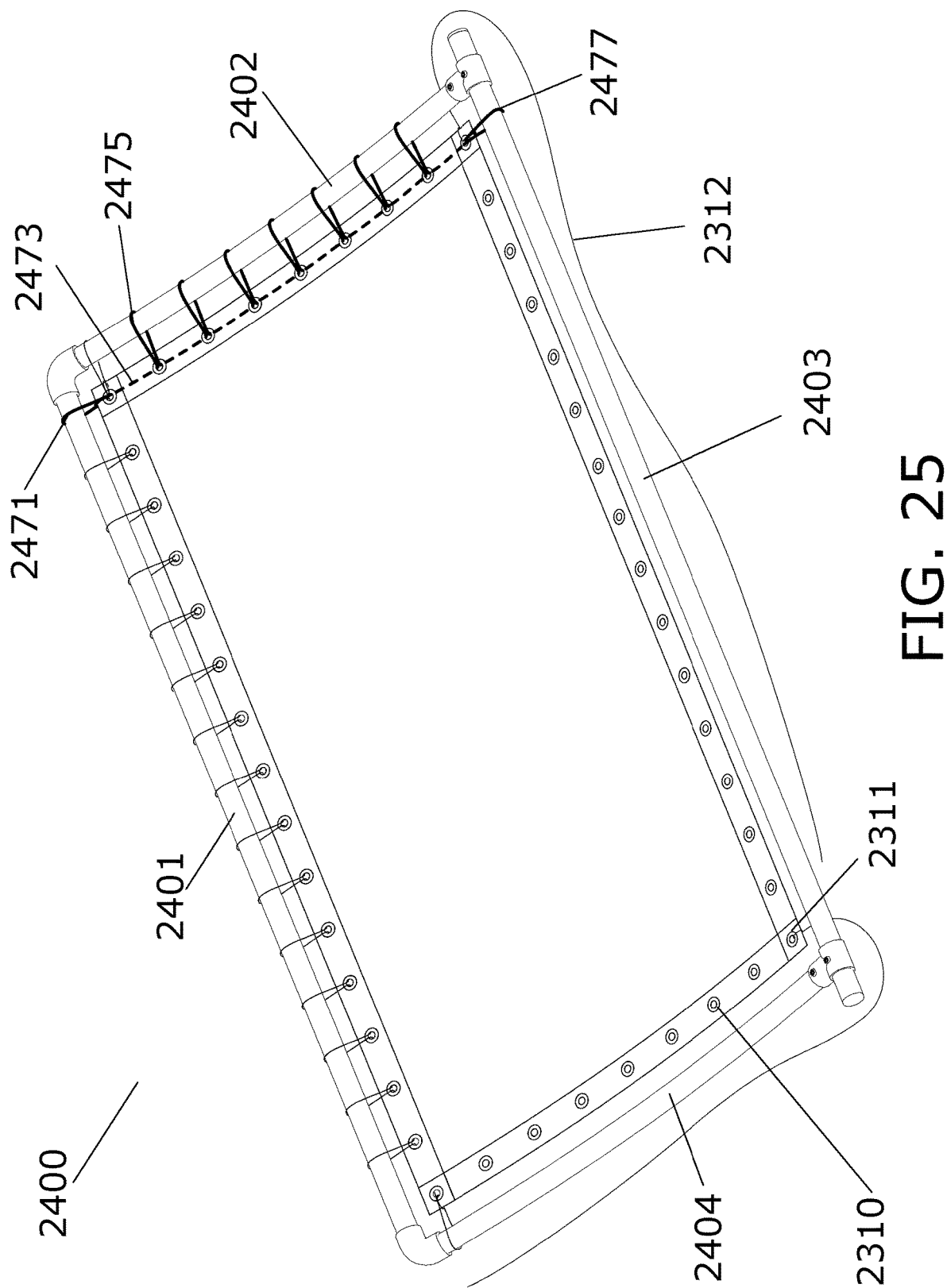
FIG. 25 is an elevated top left perspective view of a pre-strung fabric panel for a watercraft together with an exemplary frame element shown in a configuration of being laced to the exemplary frame element on a second side.
Figure 26:
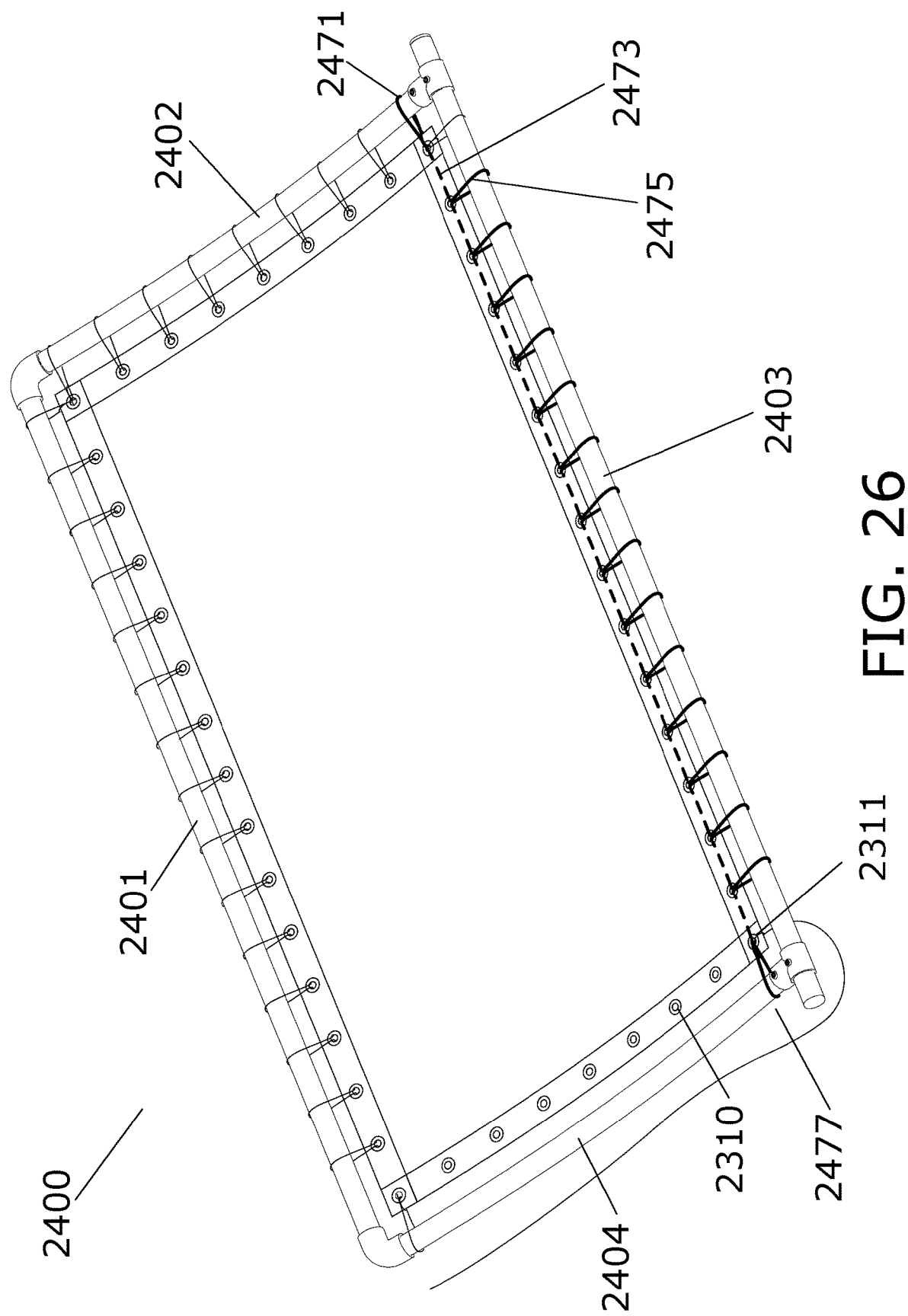
FIG. 26 is an elevated top left perspective view of a pre-strung fabric panel for a watercraft together with an exemplary frame element shown in a configuration of being laced to the exemplary frame element on a third side.
Figure 27:
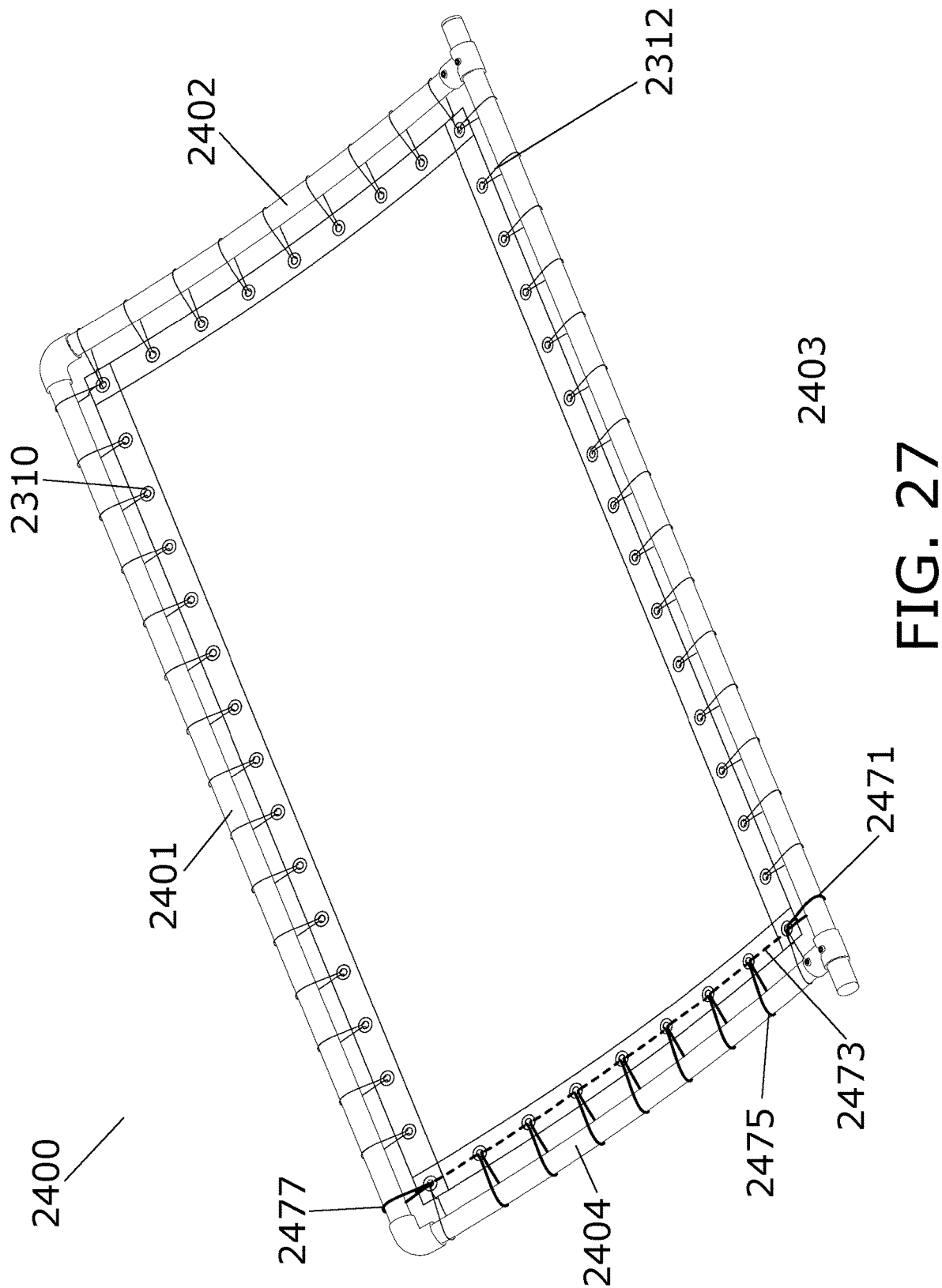
FIG. 27 is an elevated top left perspective view of a pre-strung fabric panel for a watercraft together with an exemplary frame element shown in a configuration of being laced to the exemplary frame element on a fourth side.

Referring now to FIGS. 23-27, FIGS. 23-27 depict an exemplary pre-strung fabric panel 2300 for use in the context of the watercraft of the present invention. The exemplary fabric panel 2300, which is shown in a rectangular configuration, includes a plurality of grommet holes 2310 surrounding its perimeter, including four corner grommet holes 2311. Four prefabricated cords 2312 are pre-attached to the four corner grommet holes 2311. The pre-attachment may be by tying, monolithic incorporation, or by other fasters. FIG. 24 introduces four frame elements that bound an exemplary fabric panel 2400 and are adjacent to it. The first adjacent frame member 2401 may be taken, variously, as exemplary for the aft panel top member 128 as to the aft panel 404, the forward panel top member 126 as to the forward panel 408, or the forward or aft beamwise frame members 122 or 123 as to the main panel 402. The second adjacent frame member 2402 and fourth exemplary frame member 2404 may be taken, variously, as exemplary for the forward panel side members 125 as to the forward panel 408, the aft panel side members 127 as to the aft panel 404, and the primary arch frame members 130 as to the main panel 402. The third adjacent frame member 2403 may be taken, variously, as the forward beamwise frame member 122 as to the forward panel 408, the aft beamwise frame member 123 as to the aft panel 404, or the forward or aft beamwise frame member 123 or 124 as to the main panel 402.

FIGS. 24-27 depict various steps of the lashing process, according to the method disclosed below. As shown, the exemplary fabric panel 2400 is surrounded by a first adjacent frame member 2401, a second adjacent frame member 2402, a third adjacent frame member 2403, and a fourth adjacent fame member 2404. As shown, the four adjacent frame members are joined in a rectangular configuration by 90° angle tubular connectors. Lashing, according to the method developed by the Inventor, proceeds, for each of the four pre-fabricated cords 2312, starting at that corner grommet hole 2311 at which the pre-fabricated cord 2312 is affixed, looping the cord around one of the two frame members to which it is adjacent, specifically, the one that is not going to be the length of the lashing, and back through the starting corner grommet hole 2311. The method proceeds by looping the cord 2312 around a second adjacent frame member, this time, the one that will receive the length of the lashing, and back through the starting corner grommet hole 2311 again. The method then proceeds by repeating, until completing for an ending corner grommet hole 2311, which is adjacent to both the second adjacent frame member and to a third adjacent frame member that is not the first or second adjacent frame member, (i) passing the cord 2312 through a next grommet hole 2310 adjacent to the starting corner grommet hole 2311, and (ii) passing the cord 2312 around the second adjacent tubular member and back through the next grommet hole 2310. The method then proceeds by looping the cord 2312 around the third adjacent tubular member and tying off the cord to the ending corner grommet hole.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A watercraft, comprising:
   a pair of inflatable pontoons;
   releasably affixed atop each of said pair of inflatable pontoons and aligned therewith, an inner lengthwise frame member and an outer lengthwise frame member such that loads applied to said inner lengthwise frame member and outer lengthwise frame member oppose buoyant forces applied to each of said pair of inflatable pontoons to urge each of said pair of inflatable pontoons between said inner lengthwise frame member and said outer lengthwise frame member;
   a forward beamwise frame member affixed to both said inner lengthwise frame member and said outer lengthwise frame member of both of said pair of inflatable pontoons;
   an aft beamwise frame member affixed to both said inner lengthwise frame member and said outer lengthwise frame member of both of said pair of inflatable pontoons;
   a pair of primary arch members affixed at their ends to said forward beamwise frame member and said aft beamwise frame member, each of said pair of primary arch members being configured to arch upward relative to said inner lengthwise frame member and said outer lengthwise frame member;
   a main fabric panel stretched between said pair of primary arch frame members, said forward beamwise frame member, and said aft beamwise frame member;
   a motor mount affixed centrally to said aft beamwise frame member, said motor mount being configured to removably support a motor vertical member, said motor vertical member being configured to pivot within said motor mount, said motor vertical member extending vertically down below said pontoons and supporting an electric trolling motor thereat, and said motor vertical member supporting a tiller above said motor mount;
   a pair of aft panel side members each rotatably-lockably affixed to said aft beamwise frame member;
   an aft panel top member affixed at its ends to each of said pair of aft panel side members; and
   an aft fabric panel stretched between said pair of aft panel side members, said aft beamwise frame member, and said aft panel top member, said aft fabric panel including a gap located against said aft beamwise frame member, said gap being shaped to accommodate said tiller.

2. The watercraft of claim 1, wherein at least one of said pair of inflatable pontoons is releasably affixed to said inner lengthwise frame member and/or said outer lengthwise frame member by one or more straps secured, under tension, around said inner lengthwise frame member and/or said outer lengthwise frame member and a D-ring affixed to said at least one of said pair of inflatable pontoons.

3. The watercraft of claim 1, further comprising a beamwise arch frame member affixed at its ends to both of said primary arch frame members, said beamwise arch frame member being positioned aft of lengthwise center on said watercraft and arching downward relative to said pair of primary arch frame members.

4. The watercraft of claim 1, further comprising a pair of bimini top frame members affixed rotatably-lockably to said aft panel top member at opposite ends thereof, and a bimini top fabric panel stretched between said pair of bimini top frame members.

5. The watercraft of claim 4, wherein said bimini top fabric panel comprises a flexible solar panel affixed to its top surface and a solar controller configured to regulate charging of a battery and/or operation of said electric trolling motor.

6. The watercraft of claim 1, further comprising a pair of forward panel side members rotatably-lockably affixed to said forward beamwise frame member at opposite ends thereof, a forward panel top member affixed to both of said pair of forward panel side members at the top ends thereof, and a forward fabric panel stretched between said pair of forward panel side members, said forward beamwise frame member, and said forward panel top member.

7. The watercraft of claim 1, further comprising a pair of secondary arch frame members positioned to arch upward relative to said pair of primary arch frame members and said pair of aft panel side members, each of said pair of secondary arch members being affixed, slidably-lockably and pivotably-lockably, at a secondary arch member first end, to one of said pair of primary arch frame members, and affixed, slidably-lockably and pivotably-lockably, at a secondary arch member second end, to one of said pair of aft panel side members.

8. The watercraft of claim 1, further comprising a storage panel suspended between both of said inner lengthwise frame members, said storage panel comprising a pair of storage panel beamwise verticals along its forward and aft edges.

9. The watercraft of claim 8, further comprising a waterproof battery box supported by said storage panel, said waterproof battery box including a battery in electrical communication with said electric trolling motor.

10. The watercraft of claim 9, wherein said main fabric panel comprises at least one access flap configured for accessing said storage panel and/or said battery box.

11. The watercraft of claim 10, wherein said at least one access flap includes a forward access flap and an aft access flap, said forward access panel being configured for accessing said storage panel and/or said battery box, and said aft access panel being configured for accessing a container affixed to the underside of said main fabric panel.

12. The watercraft of claim 1, wherein said main fabric panel comprises a plurality of grommet holes along its edges, said main fabric panel being lashed, by one or more cords tied to said plurality of grommet holes, to said pair of primary arch members, said forward beamwise frame member and said aft beamwise frame member.

13. The watercraft of claim 1, wherein said aft fabric panel comprises a plurality of grommet holes along its edges, said aft fabric panel being lashed, by one or more cords tied to said plurality of grommet holes, to said pair of aft panel side members, said aft beamwise frame member and said aft panel top member.

14. The watercraft of claim 6, wherein said forward fabric panel comprises a plurality of grommet holes along its edges, said forward fabric panel being lashed, by one or more cords tied to said plurality of grommet holes, to said pair of forward panel side members, said forward beamwise frame member and said aft panel top member.

15. A watercraft, comprising:
- a pair of inner lengthwise frame members positioned horizontally between and substantially parallel to a pair of outer lengthwise frame members;
- a forward beamwise frame member affixed to both of said pair of inner lengthwise frame members and both of said pair of outer lengthwise frame members;
- an aft beamwise frame member affixed to both of said pair of inner lengthwise frame members and both of said pair of outer lengthwise frame members;
- a pair of primary arch members affixed at their ends to said forward beamwise frame member and said aft beamwise frame member, each of said pair of primary arch members being configured to arch upward relative to said inner lengthwise frame member and said outer lengthwise frame member;
- a main fabric panel stretched between said pair of primary arch frame members, said forward beamwise frame member, and said aft beamwise frame member;
- a pair of aft panel side members each rotatably-lockably affixed to said aft beamwise frame member;
- an aft panel top member affixed at its ends to each of said pair of aft panel side members; and
- an aft fabric panel stretched between said pair of aft panel side members, said aft beamwise frame member, and said aft panel time member, said aft fabric panel including a gap located against said aft beamwise frame member, said gap being shaped to accommodate said tiller;
- wherein said watercraft is foldable into a first operational configuration and a second transport configuration;
- said first operational configuration comprising removably affixing each of a pair of inflatable pontoons below one of said pair of inner lengthwise frame members and one of said pair of outer lengthwise frame members such that loads applied to said pair of inner lengthwise frame members and said pair of outer lengthwise frame members oppose buoyant forces on said pair of inflatable pontoons such that said pair of inflatable pontoons is urged upward and into said pair of inner lengthwise frame members and said pair of outer lengthwise frame members;
- said first operational configuration further comprising an electric trolling motor removably mounted centrally to said aft beamwise frame member;
- said second transport configuration comprising removing said pair of inflatable pontoons and said electric trolling motor from said watercraft; and
- said second transport configuration comprising rotating said aft panel side members, together with said aft panel top member and aft fabric panel, forward such that said aft panel top member is substantially in contact with said pair of primary arch frame members.

16. The watercraft of claim 15, wherein said second transport configuration comprises affixing said watercraft to a roof rack of a motor-driven, self-propelled land vehicle.

17. The watercraft of claim 15, further comprising:
- a pair of bimini top frame members affixed rotatably-lockably to said aft panel top member at opposite ends thereof, and a bimini top fabric panel stretched between said pair of bimini top frame members;
- a pair of forward panel side members rotatably-lockably affixed to said forward beamwise frame member at opposite ends thereof;
- a forward panel top member affixed to both of said pair of forward panel side members at the top ends thereof; and
- a forward fabric panel stretched between said pair of forward panel side members, said forward beamwise frame member, and said forward panel top member; and,
- wherein said second transport configuration comprises rotating said pair of forward panel side members, together with said forward panel top member and said forward fabric panel, aft such that said forward panel top member is substantially in contact with said pair of primary arch frame members and falling short thereon of said aft panel top member; and
- wherein said second transport configuration comprises rotating said pair of bimini top frame members, together with said bimini top fabric panel, such that said bimini top fabric panel partially covers from above both a portion of said forward fabric panel and said aft fabric panel.

18. A watercraft comprising:
- a frame constructed of rigid tubular members of circular cross section;
- said frame being releasably affixed to and supported by at least two inflatable pontoons;
- said frame being releasably affixed to an electric trolling motor;
- said frame comprising one or more movable joints;
- each of said one or more movable joints comprising a tubular connector having two or more of said rigid tubular members inserted therein, said tubular connector being selected from the group consisting of: a tubular T-connector, a tubular right-angle connector, a tubular corner connector, and a tubular angled T-connector;
- each said tubular connector comprising at least one embedded bolt configured to selectively apply friction to one of said rigid tubular members inserted therein;
- a first fabric panel stretched between a first at least two of said rigid tubular members;
- a second fabric panel stretched between a second at least two of said rigid tubular members;
- said second at least two of said rigid tubular members being rotatably-lockably affixed to said frame via said one or more movable joints so as to be rotatable relative to said first at least two of said rigid tubular members;
- wherein said first fabric panel and/or said second fabric panel comprises a plurality of grommet holes along at least one edge adjacent to one of said rigid tubular members, and said first fabric panel and/or said second fabric panel is lashed to said one of said rigid tubular members by a cord; and
- wherein said first fabric panel and/or said second fabric panel is rectangular in shape and is surrounded on its four edges by four of said rigid tubular members, said first fabric panel and/or said second fabric panel is prefabricated with four cords, each affixed to a starting corner grommet hole, and each cord of said four cords is tied according to the method steps:
- starting at that corner at which said cord is affixed, looping said cord around a first adjacent tubular member adjacent to said corner and back through said starting corner grommet hole;
- looping said cord around a second adjacent tubular member adjacent to said starting corner and back through said starting corner grommet hole;
- repeating, until completing for an ending corner grommet hole adjacent to said second adjacent tubular member and a third adjacent tubular member: (i) passing said cord through a next grommet hole adjacent to said starting corner grommet hole, and (ii) passing said cord around said second adjacent tubular member and back through said next grommet hole;
- looping said cord around said third adjacent tubular member; and
- tying off said cord to said ending corner grommet hole.

\* \* \* \* \*